US012643183B1

(12) United States Patent
Liu et al.

(10) Patent No.: US 12,643,183 B1
(45) Date of Patent: Jun. 2, 2026

(54) METHOD AND APPARATUS FOR REMOVING EXPANSION BOLT FOR SEMICONDUCTOR PROCESSING APPARATUS

(71) Applicants: TSMC CHINA COMPANY LIMITED, Shanghai (CN); TAIWAN SEMICONDUCTOR MANUFACTURING COMPANY, LTD., Hsinchu (TW)

(72) Inventors: Xudong Liu, Shanghai (CN); Chi Sun, Shanghai (CN); Guangren Shi, Shanghai (CN); Jinsong Zeng, Shanghai (CN)

(73) Assignees: TSMC CHINA COMPANY LIMITED, Shanghai (CN); TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 19/090,537

(22) Filed: Mar. 26, 2025

(30) Foreign Application Priority Data

Mar. 12, 2025    (CN) .......................... 202520432362.1

(51) Int. Cl.
*B23P 19/04*          (2006.01)
*B23P 19/06*          (2006.01)
(Continued)

(52) U.S. Cl.
CPC .............. *B23P 19/06* (2013.01); *B23P 19/04* (2013.01); *B23P 19/025* (2013.01);
(Continued)

(58) Field of Classification Search
CPC ..... B23P 19/025; B23P 19/027; B23P 19/022; B23P 19/06; Y10T 29/49815; Y10T 29/49822; B25B 27/026; B25B 29/53683; B25B 29/5383; B25B 29/53952; B25B 29/53987; B25B 29/53991; B25C 11/00
See application file for complete search history.

(56) References Cited

U.S. PATENT DOCUMENTS

| | | | | | |
|---|---|---|---|---|---|
| 222,112 | A | * | 11/1879 | Wilson | ..................... B25C 11/00 29/244 |
| 2,452,457 | A | * | 10/1948 | Gray | ........................ B25B 27/18 254/18 |

(Continued)

FOREIGN PATENT DOCUMENTS

| | | | | |
|---|---|---|---|---|
| JP | 2015071216 | A | * | 4/2015 |
| WO | WO-0108852 | A1 | * | 2/2001 ............. B25C 11/00 |

*Primary Examiner* — Jermie E Cozart
(74) *Attorney, Agent, or Firm* — Maschoff Brennan

(57)          ABSTRACT

A method includes following steps. A washer and a nut are removed from a threaded rod of an expansion bolt that is secured to a drilled hole. After removing the washer and the nut, foot of a semiconductor processing apparatus is removed from the threaded rod. The washer and the nut are placed back to the threaded rod of the expansion bolt. A lifting fork of a bolt lifter is moved such that fingers of the lifting fork are located directly below the washer. The lifting fork is lifted, by using a hydraulic cylinder, to extract the washer, the nut, and the threaded rod of the expansion bolt away from the drilled hole.

20 Claims, 21 Drawing Sheets

(51) Int. Cl.
    *B23P 19/02*          (2006.01)
    *B23P 19/027*       (2006.01)
    *B25C 11/00*        (2006.01)

(52) U.S. Cl.
    CPC ............. *B23P 19/027* (2013.01); *B25C 11/00*
            (2013.01); *Y10T 29/49815* (2015.01); *Y10T*
            *29/49822* (2015.01); *Y10T 29/53683*
          (2015.01); *Y10T 29/5383* (2015.01); *Y10T*
            *29/53952* (2015.01); *Y10T 29/53987*
            (2015.01); *Y10T 29/53991* (2015.01)

(56)               References Cited

U.S. PATENT DOCUMENTS

| | | | |
|---|---|---|---|
| 3,087,236 A * | 4/1963 | Paytas ................... | B25B 27/026<br>29/244 |
| 3,961,410 A * | 6/1976 | Reed ....................... | B25B 31/00<br>29/256 |
| 5,233,740 A * | 8/1993 | Chen .................... | B25B 27/026<br>29/252 |
| 2016/0023334 A1 * | 1/2016 | Rowe ..................... | F16D 3/405<br>29/244 |
| 2020/0157841 A1 * | 5/2020 | Blank ................... | E04H 17/265 |

\* cited by examiner

METHOD AND APPARATUS FOR REMOVING EXPANSION BOLT FOR SEMICONDUCTOR PROCESSING APPARATUS

PRIORITY CLAIM AND CROSS-REFERENCE

The present application claims priority to China Application Serial Number 202520432362.1, filed Mar. 12, 2025, which is herein incorporated by reference.

BACKGROUND

In the semiconductor manufacturing industry, the production of integrated circuits involves a series of complex processes that use precise control over various environmental conditions. These processes include deposition, etching, doping, and lithography, each of which is performed in specific process conditions to ensure the integrity and performance of the semiconductor devices. To achieve these conditions, semiconductor fabrication facilities rely on a range of auxiliary equipment, such as pumps, to maintain the target pressure levels within processing chambers.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
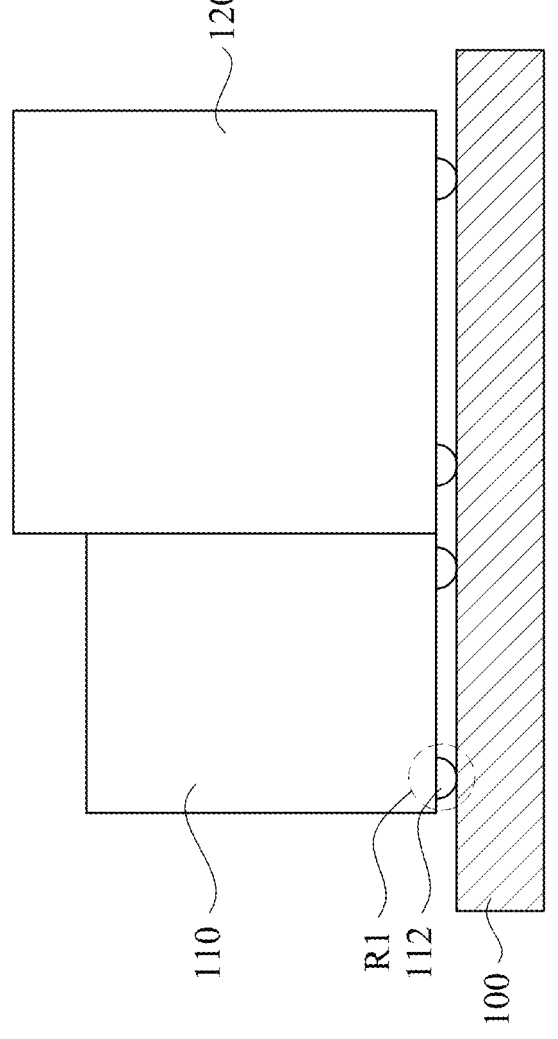
FIG. 1 is a side view illustrating a semiconductor processing chamber and an auxiliary semiconductor processing apparatus placed on an RC floor within a semiconductor fabrication facility (FAB), in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 230 degrees or at other orientations) and the spatially relative descriptors used herein may likewise be interpreted accordingly. As used herein, "around," "about," "approximately," or "substantially" may generally mean within 20 percent, or within 10 percent, or within 5 percent of a given value or range. Numerical quantities given herein are approximate, meaning that the term "around," "about," "approximately," or "substantially" can be inferred if not expressly stated. One skilled in the art will realize, however, that the values or ranges recited throughout the description are merely examples, and may be reduced with the downscaling of the integrated circuits.

In semiconductor manufacturing facilities, semiconductor machinery and auxiliary equipment, such as pumps, are secured to reinforced concrete (RC) floors using expansion bolts. This method ensures stability and prevents unwanted movement during seismic events. However, during relocation of these machines, the expansion bolts will be removed from the RC floor. The current manual methods for removing these expansion bolts can be cumbersome and inefficient, posing challenges to facility operators.

To address these challenges, the present disclosure, in various embodiments, provides a hydraulic expansion bolt removal apparatus designed to improve the extraction process. This apparatus utilizes a hydraulic cylinder to generate a pulling force, effectively extracting expansion bolts from the RC floor with greater efficiency and case. By employing hydraulic technology, the apparatus offers a more reliable and time-saving solution compared to traditional manual methods, thereby enhancing operational flexibility and reducing downtime for the relocation of semiconductor manufacturing facilities.

FIG. 1 is a side view illustrating a semiconductor processing chamber 120 and an auxiliary semiconductor processing apparatus 110 placed on an RC floor 100 within a semiconductor fabrication facility (FAB). In some embodiments, the semiconductor processing chamber 120 is where a semiconductor fabrication process such as etching, deposition, photolithography, or doping occurs. The chamber 120 is operated under controlled conditions to ensure the quality and performance of the semiconductor devices being produced. To support the controlled conditions of the semiconductor processing chamber 120, an auxiliary semiconductor processing apparatus 110, such as a pump, can pump down the pressure within the semiconductor processing chamber 120 down to a target pressure level and maintain the pressure within the semiconductor processing chamber 120 at the target pressure level. The pump 110 can serve for removing gases and contaminants from the processing environment within the semiconductor processing chamber 120, thereby allowing that semiconductor wafers are processed in a controlled environment. However, both the auxiliary semiconductor processing apparatus 110 and the processing chamber 120 are susceptible to external disturbances, such as vibrations and seismic activity, which can compromise the integrity of the manufacturing process.

To address these concerns, the auxiliary semiconductor processing apparatus 110 is equipped with vibration isolation feet 112 at a bottom surface of the auxiliary semiconductor processing apparatus 110. These vibration isolation feet 112 are securely anchored to the reinforced concrete (RC) floor 100. These vibration isolation feet 112 serve to absorb and dampen vibrations, effectively shielding the auxiliary semiconductor processing apparatus 110 and the processing chamber 120 from the adverse effects of seismic events, such as earthquakes. By isolating the auxiliary semiconductor processing apparatus 110 from ground movements, the vibration isolation foot 112 allows for maintaining the stability and precision of the semiconductor processing operations. In some embodiments, the processing chamber 120 is equipped with vibration isolation feet 112 as well.

Figure 2:
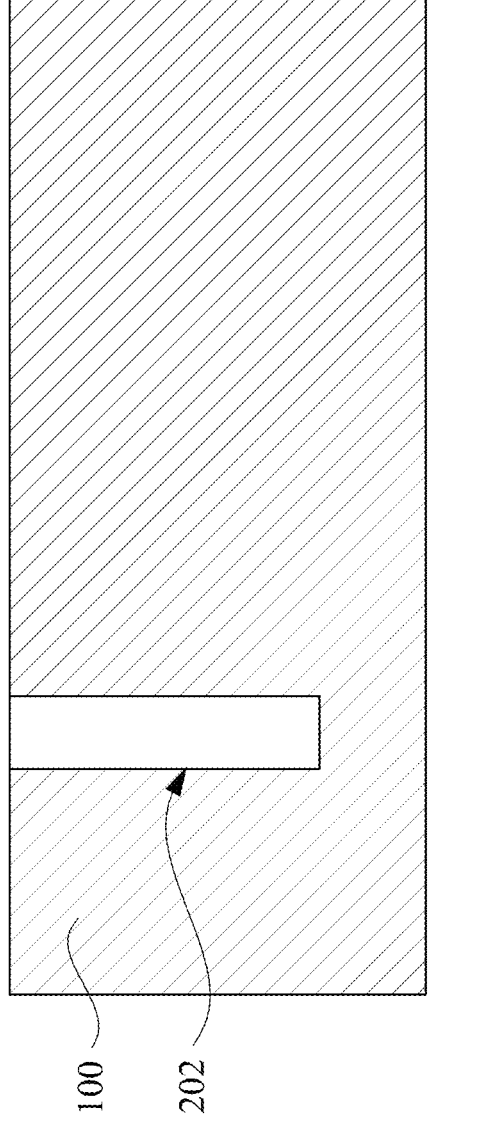
FIGS. 2-6 are side views illustrating sequential stages involved in securing the vibration isolation foot to the RC floor, in accordance with some embodiments of the present disclosure.

FIGS. 2-6 are side views zoomed-in to a partial region RI of FIG. 1 where a vibration isolation foot 112 is fixed to the RC floor 100. FIGS. 2-6 illustrate sequential stages involved in securing the vibration isolation foot 112 to the RC floor 100. At the initial step, a hole 202 is formed in the RC floor 100 to serve as the foundation for the secure installation of an expansion bolt, which then anchors the vibration isolation foot 112 onto the RC floor 100. In FIG. 2, the initial step in forming the hole 202 includes selecting an appropriate location on the RC floor 100. Once the location is determined, a drilling machine equipped with, for example, a diamond-tipped drill bit, can be employed to drill the hole 202 in the RC floor 100. The use of a diamond-tipped drill bit allows for efficiently penetrate the dense and robust structure of the reinforced concrete material within the RC floor 100 without causing cracks or structural damage to the floor 100. The drilling process is conducted with meticulous attention to depth and diameter specifications, ensuring that the hole 202 is adequately sized to accommodate the expansion bolt in the subsequent step. In some embodiments, throughout the drilling operation, water or a suitable coolant is applied to the drill bit to minimize heat generation and reduce wear, thereby enhancing the precision and longevity of the drilling equipment. Once the hole 202 is drilled to the desired specifications, it can be cleaned to remove any debris or dust, ensuring a clean and unobstructed path for the subsequent insertion of the expansion bolt. This careful preparation allows for achieving a secure and stable installation of the vibration isolation foot 112, thereby mitigating the effects of vibrations and seismic activity on the auxiliary equipment and semiconductor processing chamber 120.

Figure 3:
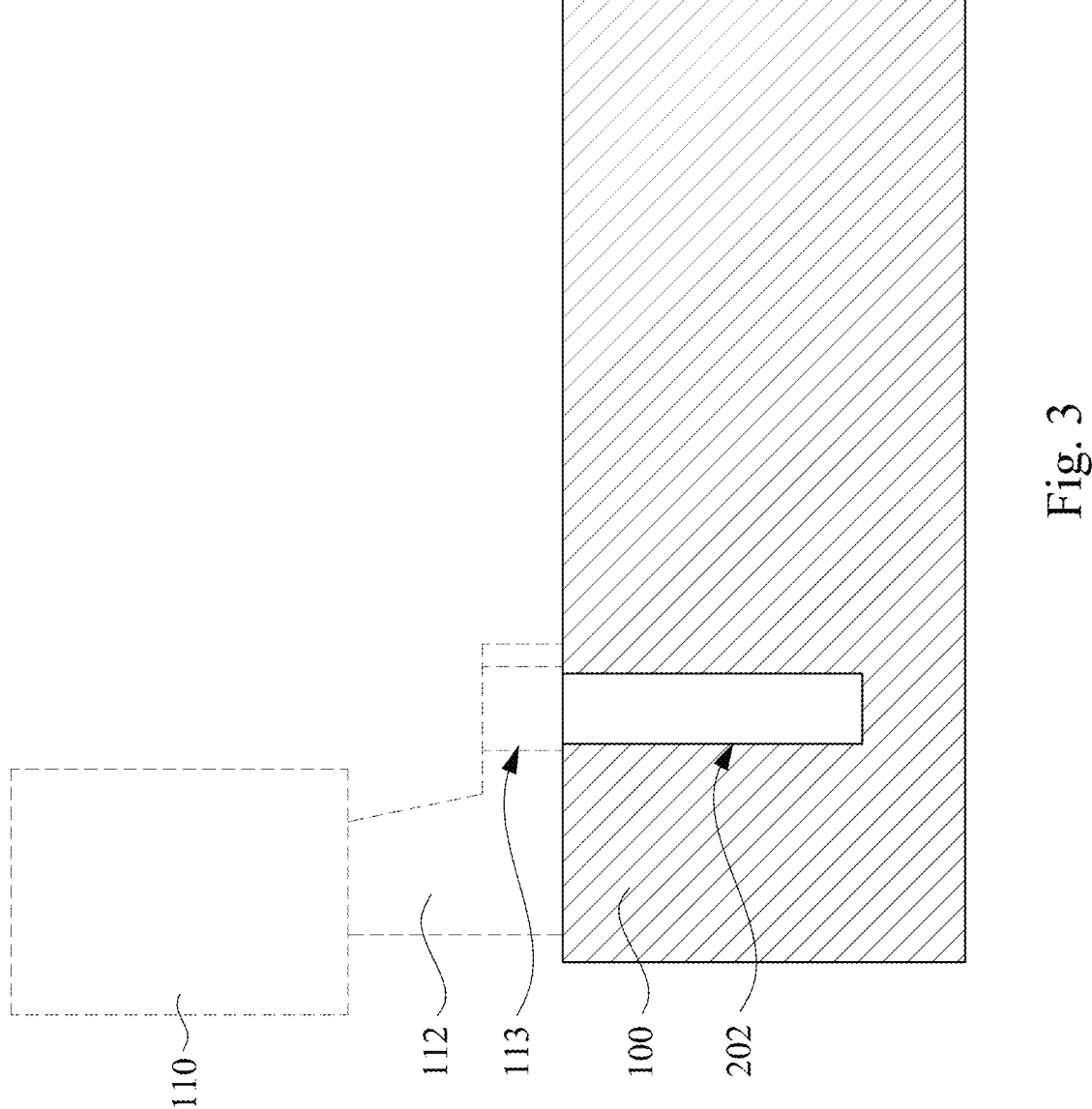

Following the initial preparation of the drilled hole 202 in RC floor 100, as illustrated in FIG. 3, the next step includes placing the vibration isolation foot 112 of the auxiliary semiconductor processing apparatus 110 placed onto the RC floor 100, such that the through hole 113 extending through the vibration isolation foot 112 is aligned with the drilled hole 202 in the RC floor 100. To achieve this alignment, operators may use alignment tools or guides to move the vibration isolation foot 112 such that the through hole 113 in the isolation foot 112 is directly above the drilled hole 202 in the RC floor 100.

In some embodiments, the diameter of the through hole 113 in the vibration isolation foot 112 is strategically designed to allow different installation scenarios. When the through hole 113 has a diameter substantially the same as the diameter of the drilled hole 202 in the RC floor 100, this configuration allows for a precise fit for the expansion bolt. Such an arrangement facilitates a direct and secure connection, minimizing any potential for lateral movement of the auxiliary semiconductor processing apparatus 110 and ensuring that the vibration isolation foot 112 remains firmly anchored to the RC floor 100.

Alternatively, in some embodiments, the through hole 113 of the vibration isolation foot 112 is designed with a diameter greater than that of the drilled hole 202 in the RC floor 100. This configuration provides additional clearance, allowing for easier alignment and installation of the expansion bolt. The increased diameter for the through hole 113 can accommodate slight positional adjustments, which can be advantageous when aligning the vibration isolation foot 112 with other structural elements or when compensating for minor surface irregularities on the RC floor 100. This flexibility can simplify the installation process and reduce the likelihood of misalignment during the insertion of the expansion bolt.

Alternatively, in some embodiments, the through hole 113 of the vibration isolation foot 112 has a diameter less than that of the drilled hole 202 in the RC floor 100. This design creates a more constrained fit, where the expansion bolt will be tightly guided through the vibration isolation foot 112. Such a configuration enhances the stability of the installation by providing a more rigid connection, which is particularly useful in high-vibration environments. By minimizing any potential movement of the vibration isolation foot 112 relative to the RC floor 100, this approach helps maintain the integrity of the auxiliary equipment 110 and the semiconductor processing chamber 120.

Figure 4:
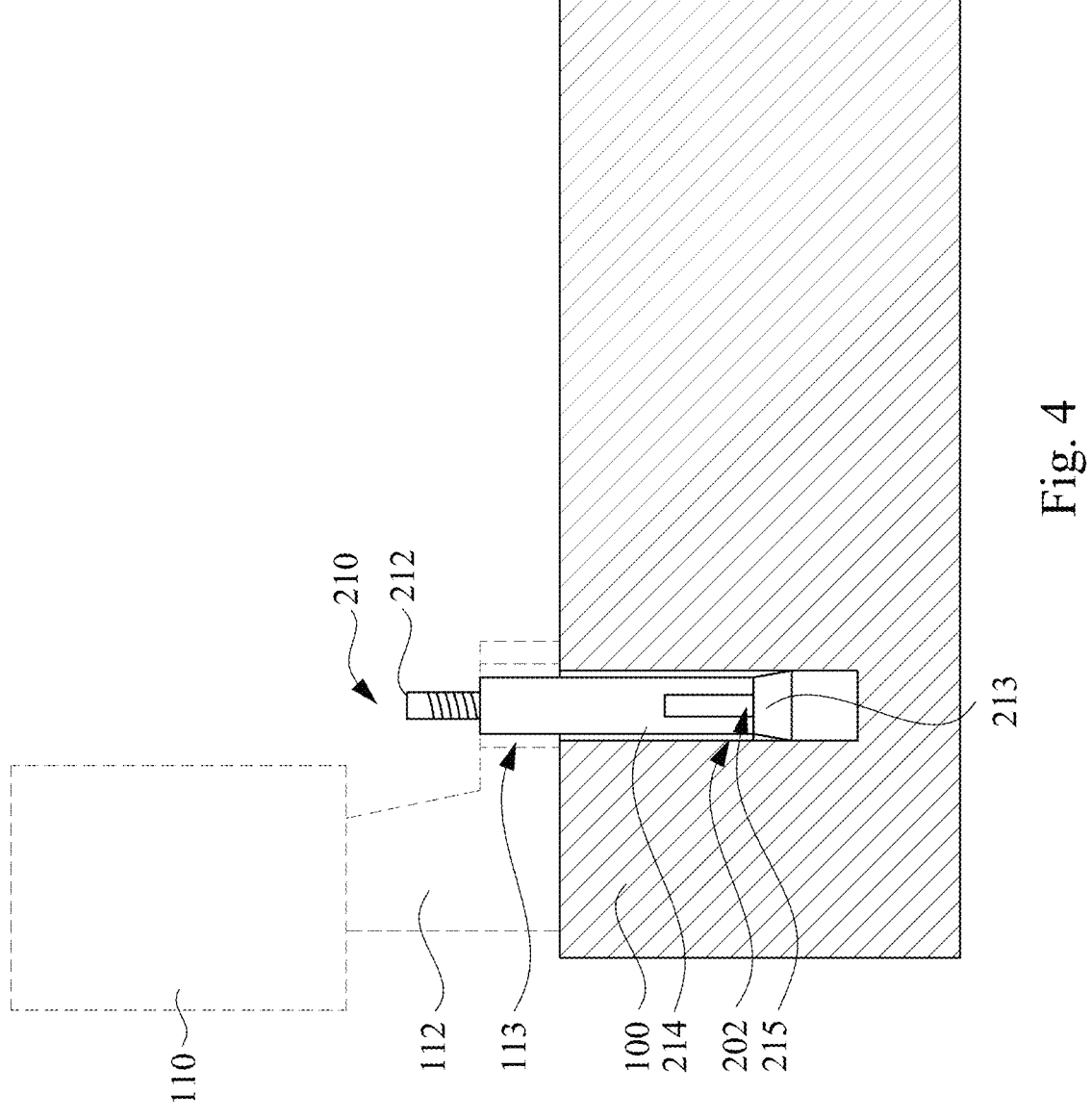

As depicted in FIG. 4, the process continues with the insertion of an expansion bolt 210 into the drilled hole 202 in the RC floor 100 through the through hole 113 in the vibration isolation foot 112. The expansion bolt 210 comprises a threaded rod 212 and an expandable sleeve 214, which is fitted onto the threaded rod 212. The expandable sleeve 214 serves to secure anchoring of the expansion bolt 210 within the drilled hole 202 in a following step.

In some embodiments, the expandable sleeve 214 is fitted onto the threaded rod 212 from a top end of the threaded rod 212, sliding down until a bottom rim of the expandable sleeve 214 comes into contact with an anchor frustum 213 located at the bottom end of the threaded rod 212. The anchor frustum 213 serves for providing an inclined surface against which the sleeve 214 can be expanded. The expandable sleeve 214 may include one or more slits 215, which allows for controlled expansion for the sleeve 214. These slits 215 enable the expandable sleeve 214 to flex outwardly when an upward force is applied by the anchor frustum 213, effectively increasing the diameter of the expandable sleeve 214. This expansion process ensures that the expandable sleeve 214 presses firmly against the inner walls of the drilled hole 202 in the RC floor 100, creating a secure and stable connection that anchors the vibration isolation foot 112 to the RC floor 100.

Figure 5:
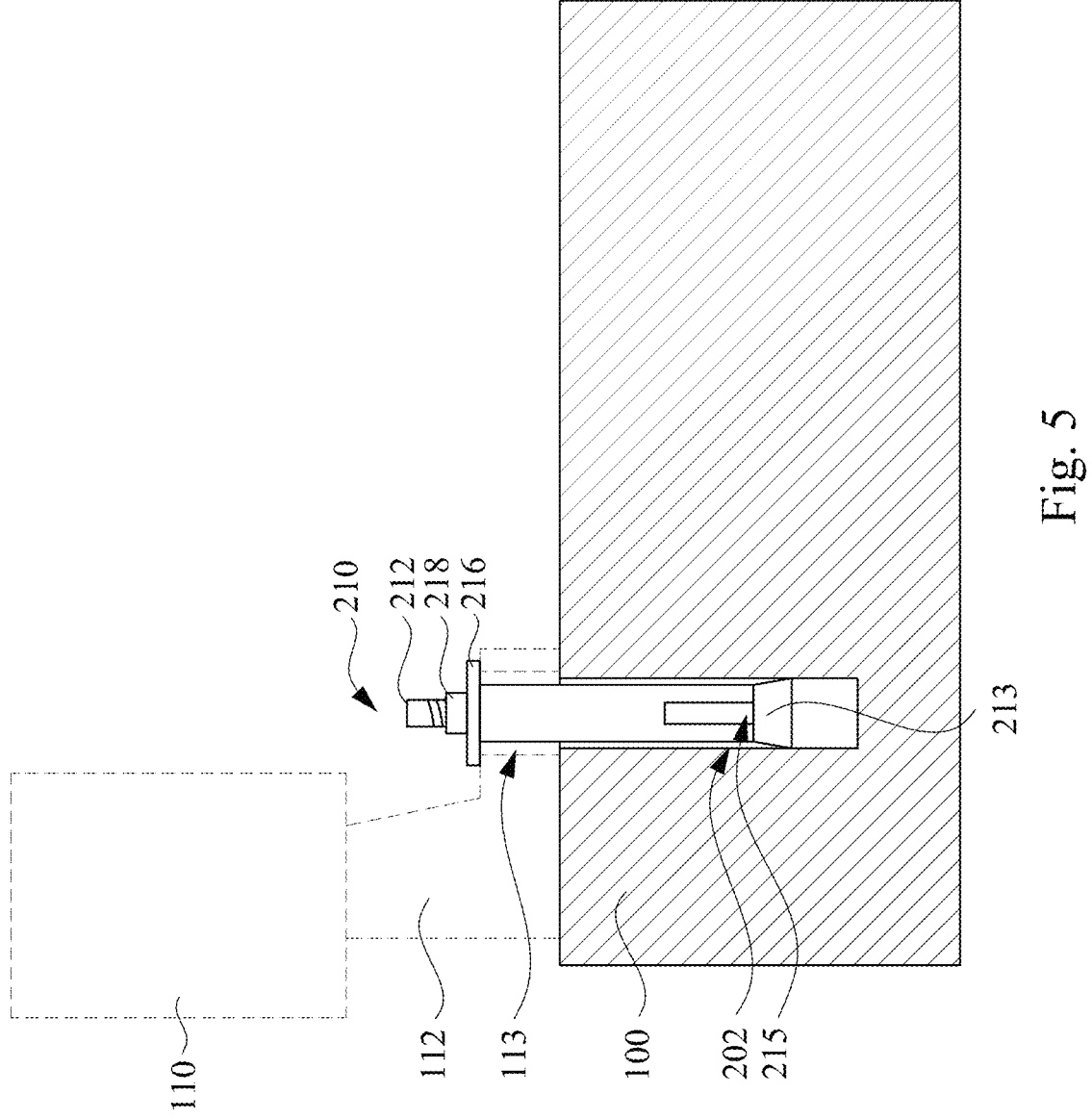

In the subsequent step as illustrated in FIG. 5, the assembly of the expansion bolt 210 continues with the placement of a washer 216 onto the threaded rod 212. This washer 216 is positioned directly above the expandable sleeve 214, serving to distribute the load evenly and protects the sleeve 214 during the tightening process. The washer 216 facilitates that the force applied by the nut 218 is uniformly transmitted to the sleeve 214. Following the placement of the washer 216, a nut 218 is threaded onto the threaded rod 212, resting atop the washer 216. The nut 218 serves for the application of an upward force on the threaded rod 212.

Figure 6:
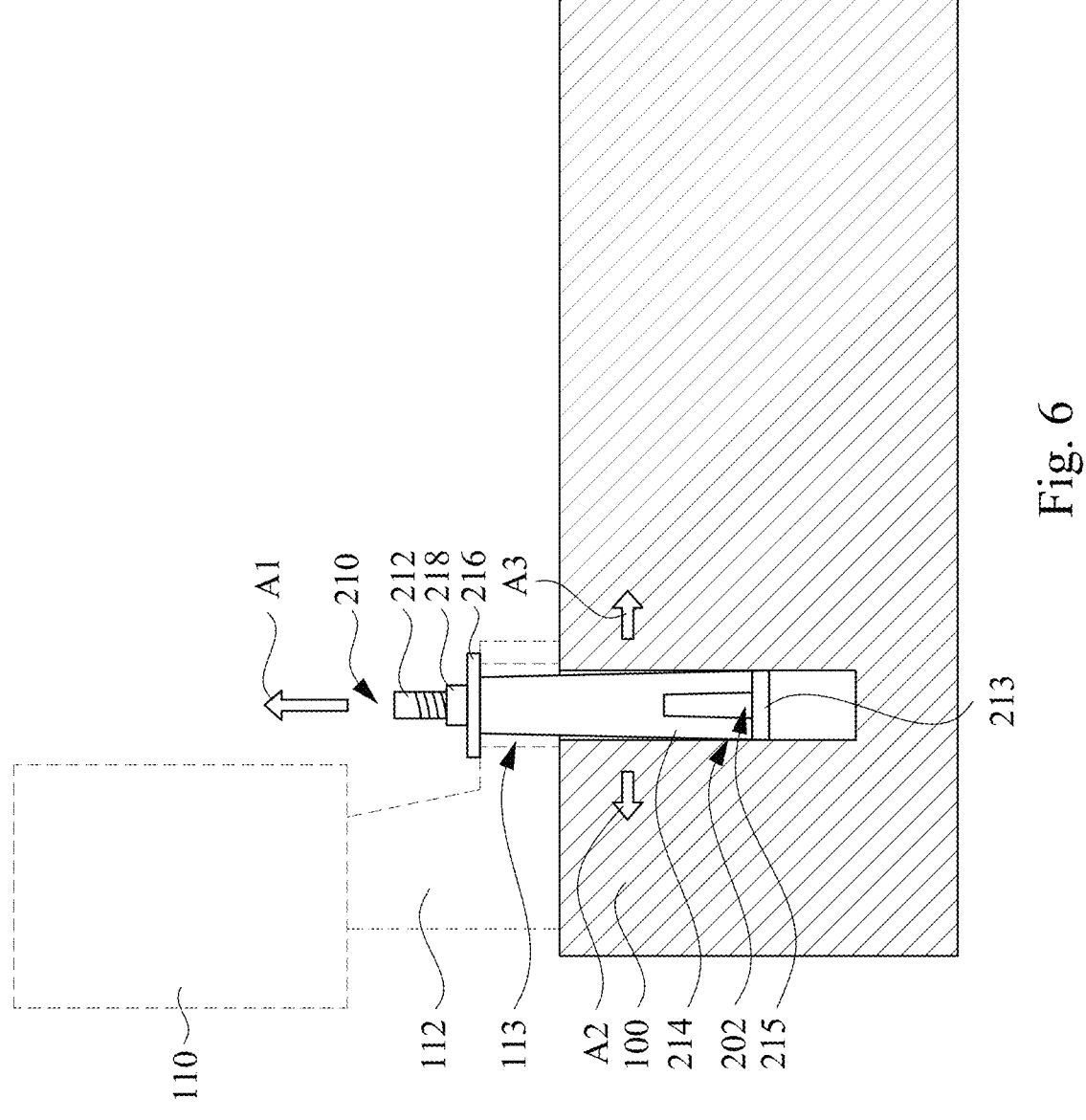

In the next stage of the securing process, as depicted in FIG. 6, the tightening and rotation of the nut 218 facilitates securing the expansion bolt 210 within the drilled hole 202 in the RC floor 100. As the nut 218 is rotated, it draws the threaded rod 212 upwards in a vertical direction, as indicated by arrow A1. This upward movement causes the anchor frustum 213 at the bottom of the threaded rod to engage with the expandable sleeve 214, initiating the expansion process to the expandable sleeve 214.

As the threaded rod 212 continues its upward movement, the inclined sidewall of the anchor frustum 213 exerts both an upward force and a horizontal force on the expandable sleeve 214. These forces cause the sleeve 214 to expand outwardly in a horizontal direction, as denoted by arrows A2 and A3. This outward expansion results in the sleeve 214 pressing firmly against the inner walls of the drilled hole 202 in the RC floor 100. The expansion creates a tight and secure engagement between the sleeve 214 and the RC floor 100, effectively anchoring the vibration isolation foot 112. This mechanism ensures that the vibration isolation foot 112 is firmly anchored, providing the resistance to vibrations and seismic forces.

Figure 7:
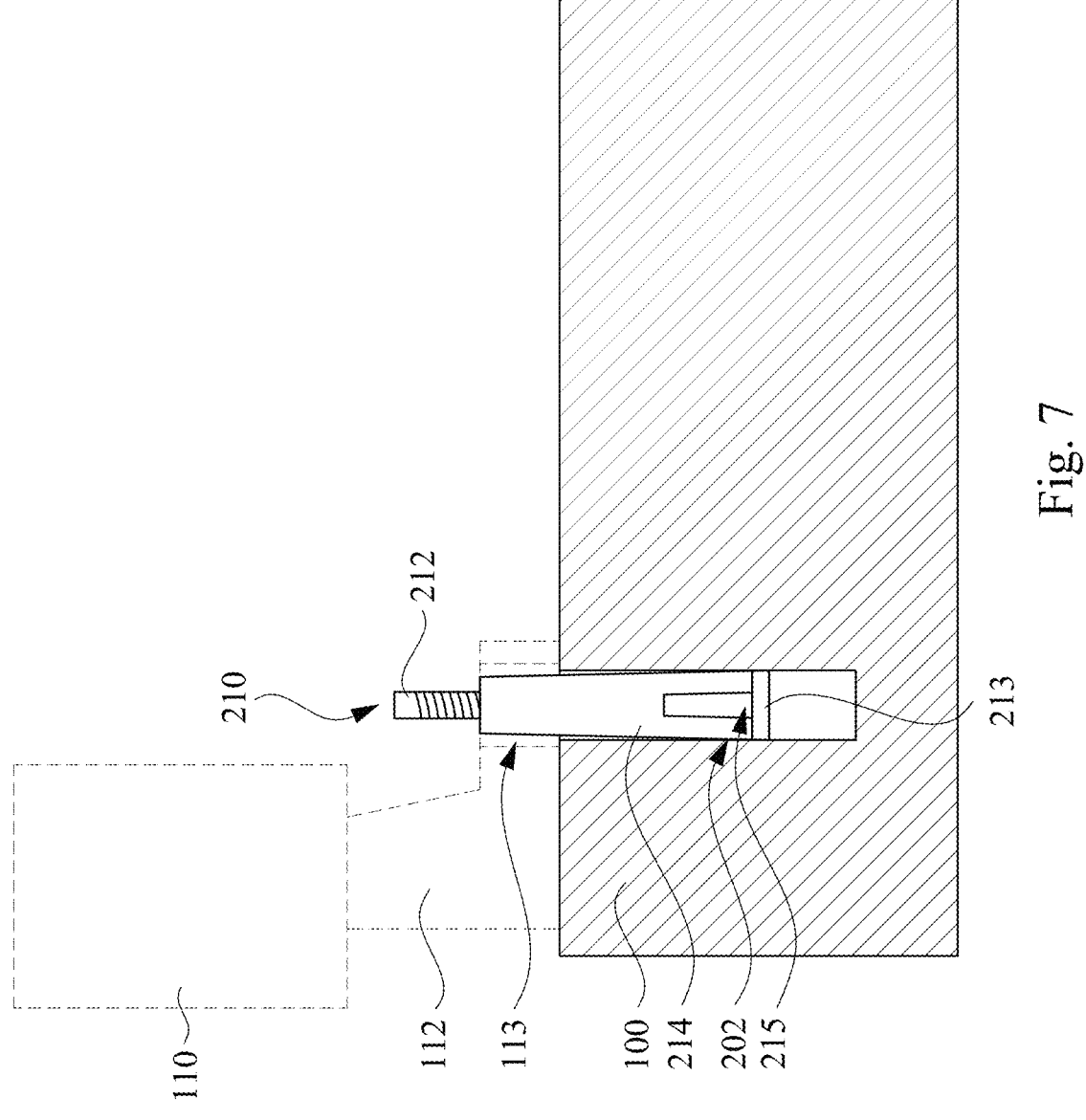
FIGS. 7-14 illustrate sequential stages involved in removing the vibration isolation foot and the expansion bolt, and restoring the RC floor, in accordance with some embodiments of the present disclosure.

FIGS. 7-14 are side views zoomed-in to the partial region RI of FIG. 1 where the vibration isolation foot 112 is fixed to the RC floor 100. FIGS. 7-14 illustrate sequential stages involved in removing the vibration isolation foot 112 and the expansion bolt 210, and restoring the RC floor 100, in accordance with some embodiments of the present disclosure. In FIG. 7, the initial step involves the removal of the washer 216 and the nut 218 from the threaded rod 212. This action eliminates the vertical constraint previously imposed on the vibration isolation foot 112, freeing the vibration isolation foot 112 for removal.

Figure 8:
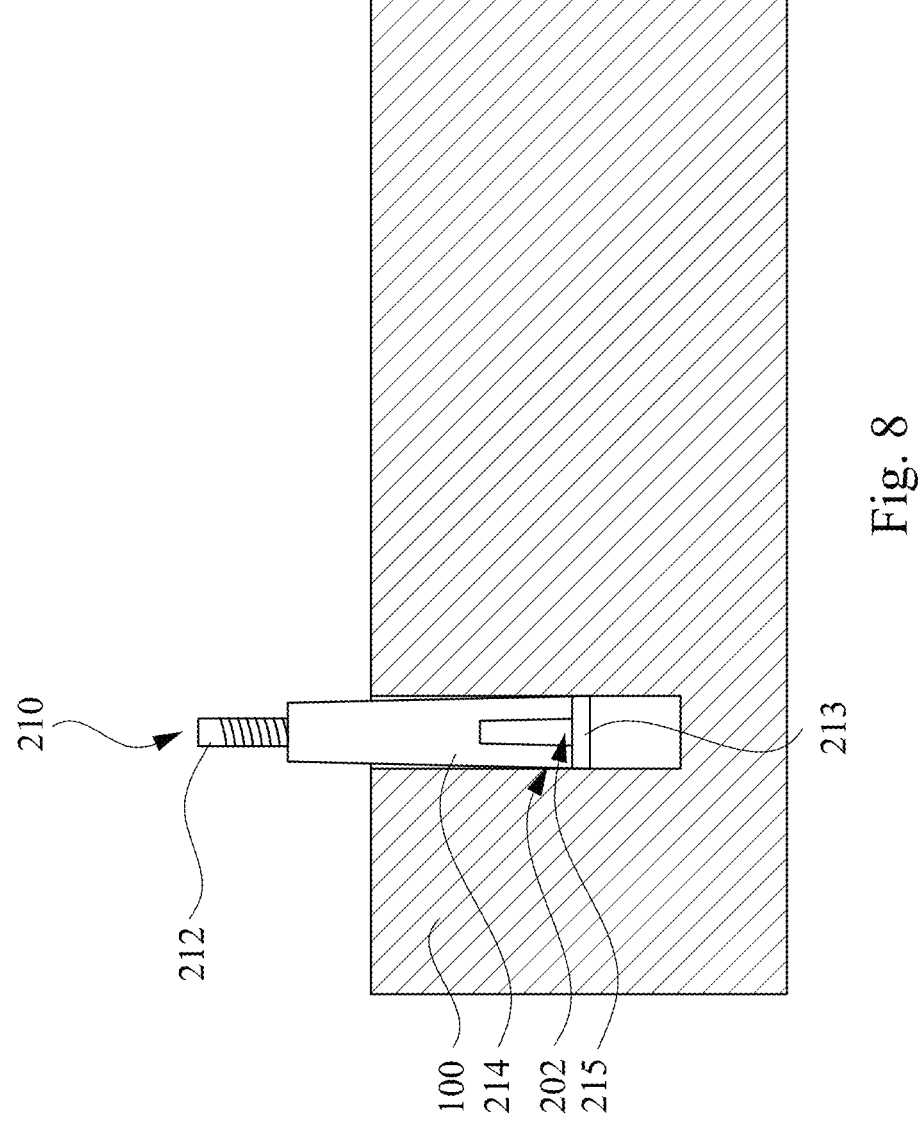

Following this, as illustrated in FIG. 8, the vibration isolation foot 112 is lifted upwards and removed from the threaded rod 212. This step is facilitated by the absence of the washer 216 and nut 218, which previously secured the vibration isolation foot 112 in place. The removal of the vibration isolation foot 112 exposes the expansion bolt 210, especially the threaded rod 212 and the expandable sleeve 214, allowing for further disassembly and eventual extraction of the expansion bolt 210 from the drilled hole 202 in the RC floor 100.

Figure 9:
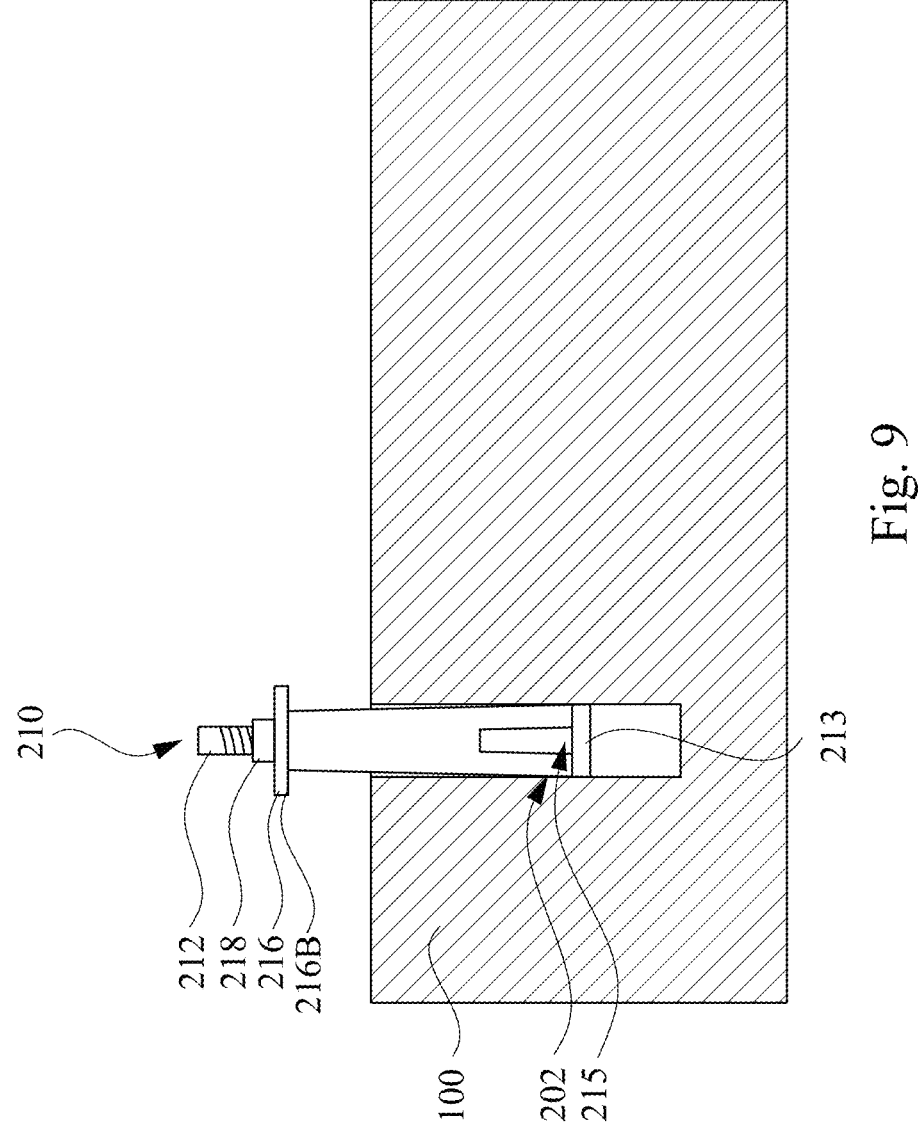

In FIG. 9, the process of removing the expansion bolt 210 from the drilled hole 202 in the RC floor 100 continues with the strategic reinstallation of the washer 216 and the nut 218 onto the threaded rod 212. In some embodiments, the washer 216 is placed back onto the threaded rod 212, followed by threading the nut 218 back onto the threaded rod 212. This setup facilitates the use of the hydraulic expansion bolt removal apparatus 300 (as shown in FIG. 10) for removing the expansion bolt 210.

In some embodiments, the washer 216 has an outer diameter that exceeds both a diameter of the threaded rod 212 and a diameter of a top rim of the expandable sleeve 214. This allows that the washer 216 laterally extends beyond the circumferential surfaces of both the threaded rod 212 and the expandable sleeve 214. This extension allows the washer 216 provides a horizontal bottom surface 216B extending laterally beyond the threaded rod 212 and the expandable sleeve 214, serving as a contact area for the hydraulic removal apparatus 300.

Figure 10:
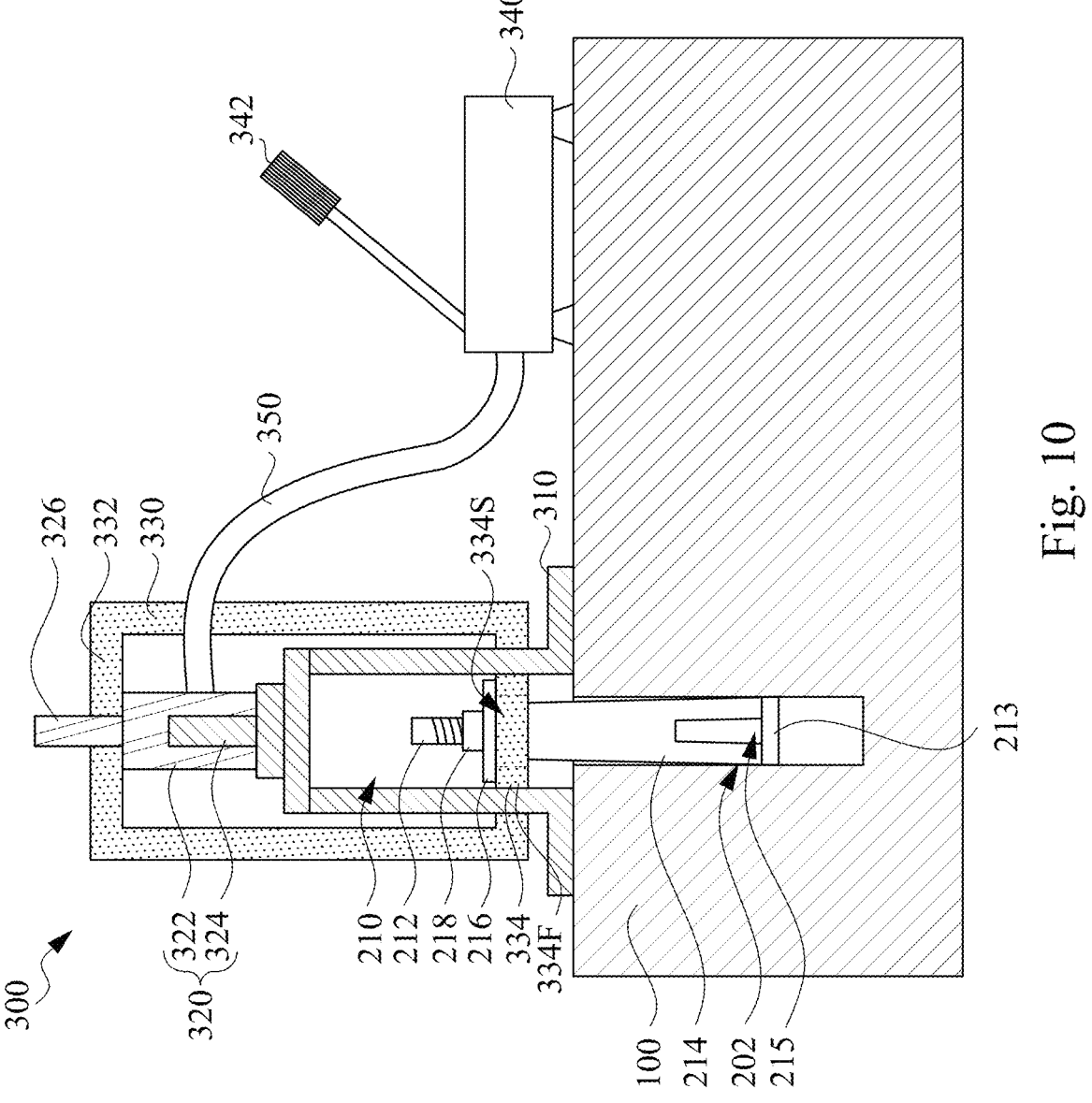

Next, in FIG. 10, the hydraulic expansion bolt removal apparatus 300 is strategically positioned on the RC floor 100 to facilitate the extraction of the expansion bolt 210. This hydraulic expansion bolt removal apparatus 300 is designed to engage with the horizontal bottom surface 216B of the washer 216, applying an upward force for the removal process. The apparatus 300 includes a ground support frame 310, a hydraulic cylinder 320 disposed on the ground support frame 310, a bolt lifter 330 that can be elevated by the hydraulic cylinder 320, a hydraulic source 340, and a fluid conduit 350 fluidly connecting the hydraulic source 340 to the hydraulic cylinder 320.

In some embodiments, the hydraulic cylinder 320 has an extendable length that allows it to extend vertically, e.g., upwardly, providing the lifting force for the bolt lifter 330. The bolt lifter 330 includes a top plate 332, which is supported by the top surface of the barrel 322 of the hydraulic cylinder 320. Extending below the washer 216 is a lifting fork 334 of the bolt lifter 330, which serves for lifting the expansion bolt 210. This lifting fork 334 includes two fingers 334F that press upwards against opposite regions of the washer's bottom surface 216B, such as the left and right regions, and a slot 334S situated between the fingers 334F. The slot 334S is designed to accommodate the expansion bolt 210, allowing the bolt lifter 330 to move horizontally at a low elevation until the expansion bolt 210 is received within the slot 334S.

The initial step in operating the hydraulic expansion bolt removal apparatus 300 includes lowering the hydraulic expansion bolt removal apparatus 300 until the ground support frame 310 reaches on the RC floor 100. Once in position, the hydraulic expansion bolt removal apparatus 300 is moved horizontally, aligning the lifting fork 334 beneath the washer 216. This horizontal movement continues until the expansion bolt 210 is received into the slot 334S in the lifting fork 334, ensuring that the expansion bolt 210 is properly positioned for removal.

Figure 11A:
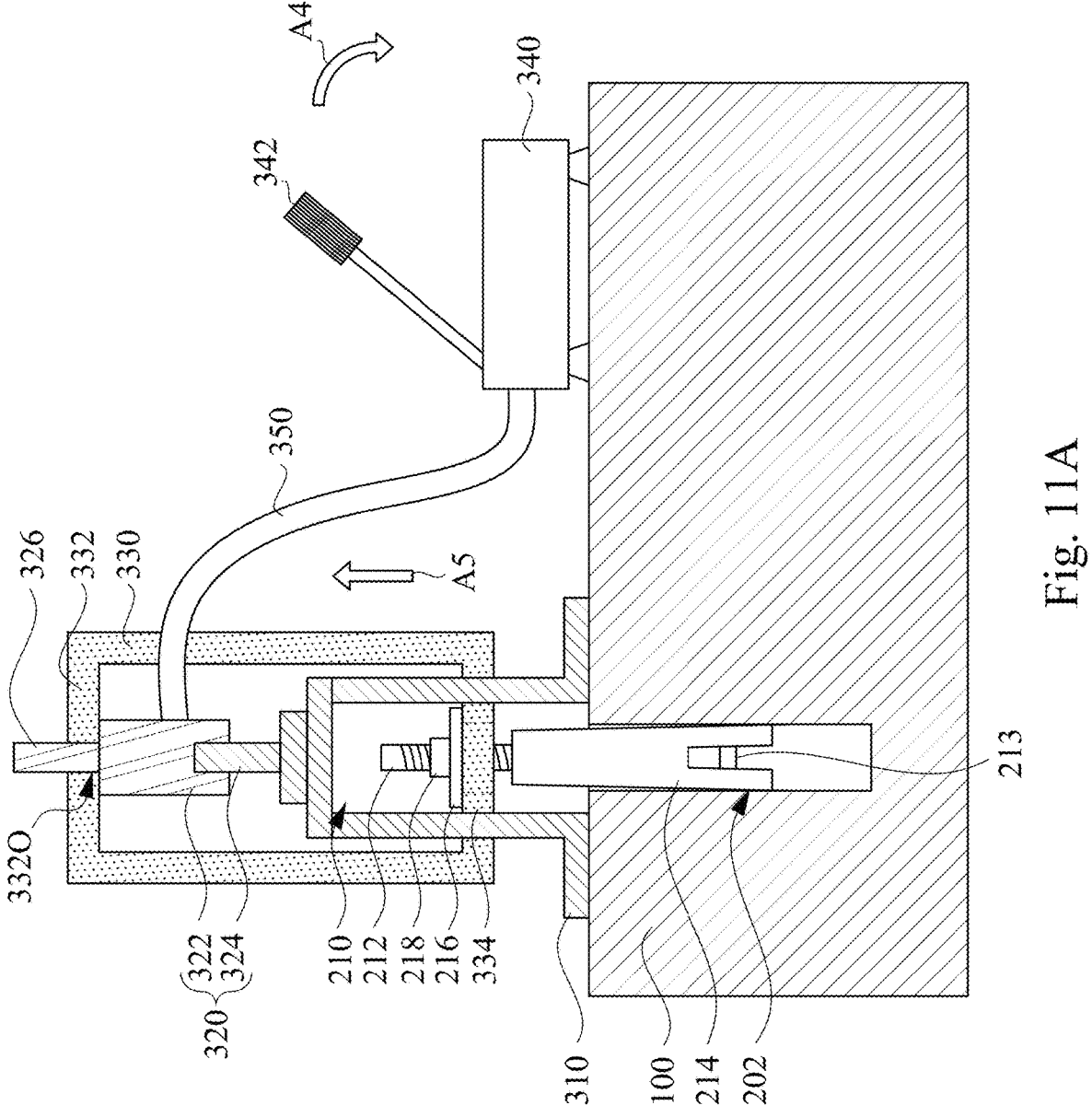

In FIG. 11A, the next step in operating the hydraulic expansion bolt removal apparatus 300 is depicted, illustrating the mechanism by which the expansion bolt 210 is extracted from the drilled hole 202 in the RC floor 100. The process begins with the operator operating the hydraulic source 340 by repeatedly pressing down the handle 342 of the hydraulic source 340, as indicated by arrow A4. This action pressurizes the hydraulic fluid within the hydraulic source 340, generating hydraulic pressure within the hydraulic source 340, which is transmitted through the fluid conduit 350 to the hydraulic cylinder 320, thereby pressurizing the hydraulic fluid within the hydraulic cylinder 320.

The generated hydraulic pressure causes the barrel 322 of the hydraulic cylinder 320 to move upwards, performing an upward linear motion relative to the piston rod 324, as denoted by arrow A5. This upward movement is facilitated by the fixed positioning of the piston rod 324, which is mounted on the ground support frame 310. The ground support frame 310, resting on the RC floor 100, prevents any downward movement of the piston rod 324, ensuring that the hydraulic force is directed upwards. Additionally, the horizontal movement of the barrel 322 is constrained by the presence of a top rod 326 of the hydraulic cylinder 320, which extends upwards from the barrel 322. This top rod 326 is inserted into an opening 3320 in the top plate 332 of the bolt lifter 330. The engagement of the top rod 326 within the opening 3320 confines the horizontal movement of the barrel 322, ensuring that the hydraulic force is directed upwards. This configuration allows the hydraulic cylinder 320 to exert a controlled upward force on the bolt lifter 330, which in turn applies this upward force to the bottom surface 216B of the washer 216.

The upward movement of the bolt lifter 330 translates into an upward force being exerted on the bottom surface 216B of the washer 216. This upward force effectively pulls the washer 216, along with the nut 218 and the threaded rod 212, away from the drilled hole 202 in the RC floor 100. The coordinated action of the hydraulic expansion bolt removal apparatus 300 ensures a smooth and controlled extraction of the expansion bolt 210, minimizing the risk of damage to the surrounding concrete and facilitating the restoration or reconfiguration of the RC floor 100.

Figure 11B:
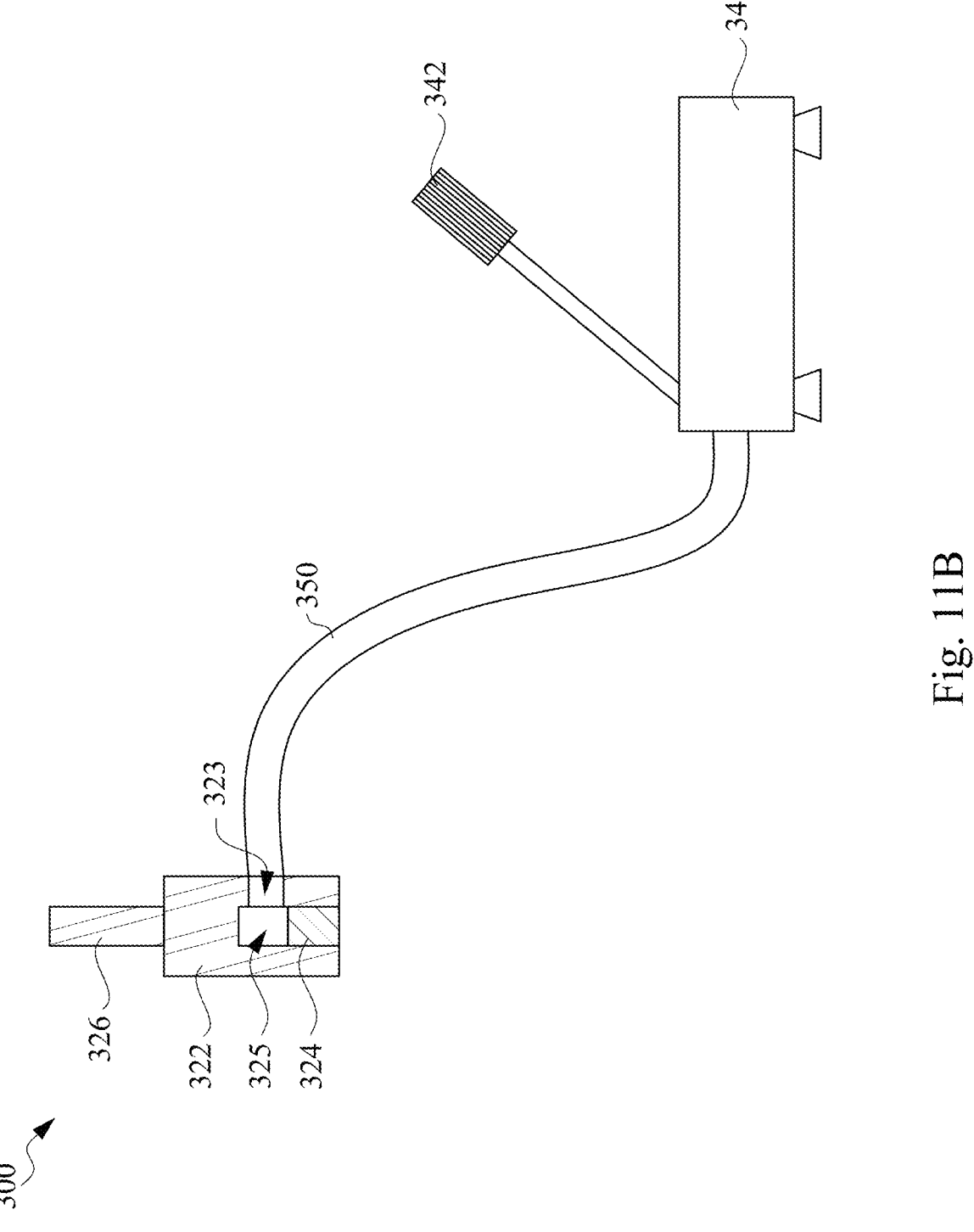

FIG. 11B is a schematic cross-sectional view zoomed-in to the hydraulic expansion bolt removal apparatus 300, in accordance with some embodiments of the present disclosure. In some embodiments, the barrel 322 has a fluid inlet port 323, which serves as the connection for the fluid conduit 350. This conduit 350 fluidly connects the hydraulic cylinder 320 to the hydraulic source 340, allowing the hydraulic fluid to flow into the hydraulic cylinder 320.

In some embodiments, the hydraulic cylinder 320 includes a fluid chamber 325 within the barrel 322. The fluid chamber 325 is in direct fluid communication with the fluid inlet port 323, which connects to the hydraulic source 340 via the fluid conduit 350. In some embodiments, the fluid chamber 325 is positioned directly above the piston rod 324, serving to contain the hydraulic fluid, facilitating the upward movement of the barrel 322 when hydraulic pressure is applied and increased.

The operation begins with the operator pressing down on the handle 342 of the hydraulic source 340, which generates hydraulic pressure. This pressure forces the hydraulic fluid into the fluid chamber 325 through the fluid inlet port 323. As the fluid chamber 325 fills, the incompressible nature of the hydraulic fluid, such as oil or another suitable incompressible fluid, allows that the pressure is effectively transferred to the barrel 322. This pressure causes the barrel 322 to rise, while the piston rod 324 remains stationary, being fixedly mounted on the ground support frame 310.

In some embodiments, the fluid chamber 325 is designed as a cylindrical chamber with a diameter that is either substantially the same as or less than the diameter of the piston rod 324. These dimensions allow the fluid chamber 325 to confine the hydraulic fluid to the region directly above the piston rod 324, thereby concentrating the upward force against the barrel 322. By concentrating the hydraulic pressure in this manner, the efficiency of the lifting operation can be improved, allowing that the bolt lifter 330 is raised smoothly and effectively. This precise control over the hydraulic forces allows for the efficient extraction of the expansion bolt 210, minimizing potential damage to the RC floor 100 and facilitating easy restoration to the RC floor 100.

Figure 12:
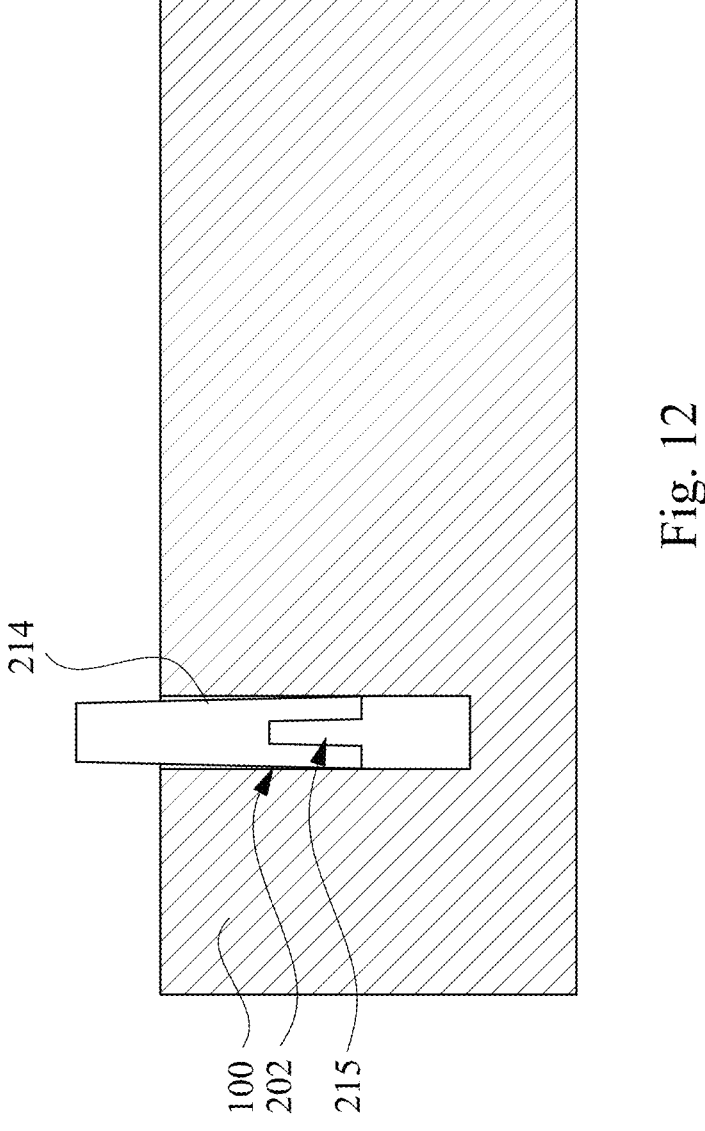

In some embodiments, the hydraulic expansion bolt removal apparatus 300 is operated until the washer 216, the nut 218 and the threaded rod 212 are extracted from the drilled hole 202 in the RC floor 100, while the expandable sleeve 214 remains in the drilled hole 202, as illustrated in FIG. 12. This is because the expandable sleeve 214 has already tightly engaged with the inner sidewalls of the drilled hole 202 due to the lateral expansion exerted during the step as illustrated in FIG. 6. In particular, during the extraction process, the hydraulic expansion bolt removal apparatus 300 applies an upward force to the washer 216, which is transmitted through the nut 218 and the threaded rod 212. As the hydraulic pressure causes the barrel 322 to rise, the bolt lifter 330 lifts these components away from the drilled hole 202. The expandable sleeve 214, however, remains lodged within the drilled hole 202. This is because the sleeve 214 has expanded outwardly to press firmly against the inner sidewalls of the drilled hole 202, creating a tight fit that resists the upward force applied to the other components, such as the washer 216, the nut 218, and the threaded rod 212, of the expansion bolt 210.

Figure 13:
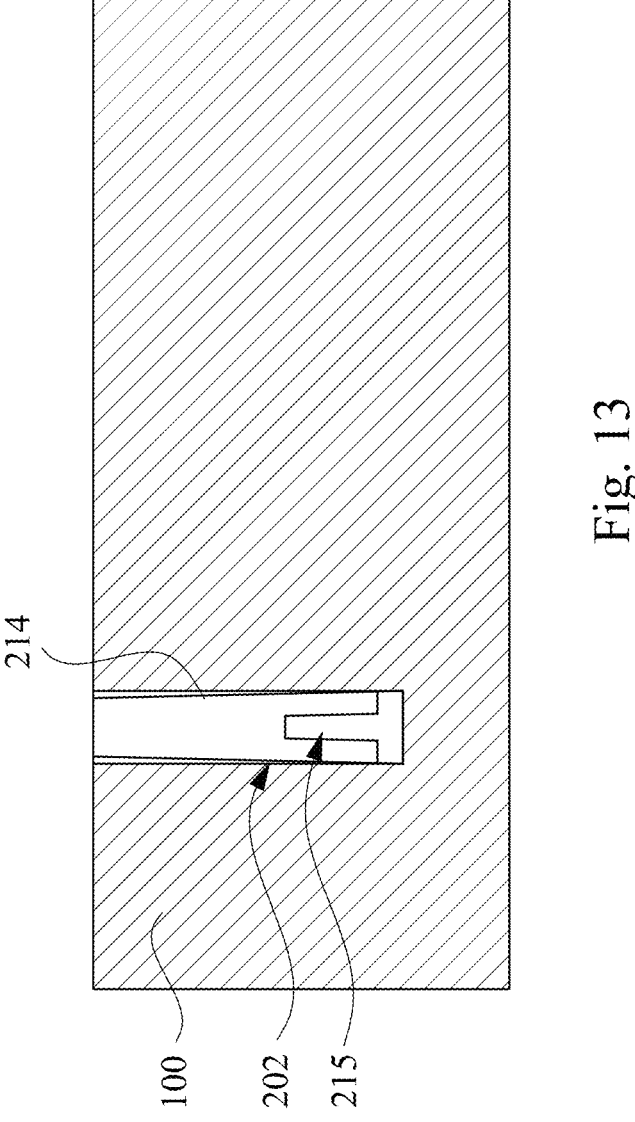

In FIG. 13, the process continues with the handling of the expandable sleeve 214, which remains lodged within the drilled hole 202 after the extraction of the washer 216, nut 218, and threaded rod 212. To ensure that the expandable sleeve 214 does not protrude above the surface of the RC floor 100, the expandable sleeve 214 is carefully dislodged and pushed further down into the drilled hole 202. This is achieved by applying a downward force to the expandable sleeve 214, such as knocking it loose from its tight engagement with the inner sidewalls of the drilled hole 202. The force is applied in a controlled manner, ensuring that the expandable sleeve 214 is dislodged without causing damage to the surrounding concrete of the RC floor 100. As the sleeve 214 is knocked downwards, it completely falls into the drilled hole 202, settling below the surface level of the RC floor 100. By dislodging the expandable sleeve 214 to make it fully confined within the drilled hole 202, the surface of the RC floor 100 is left unobstructed.

Figure 14:
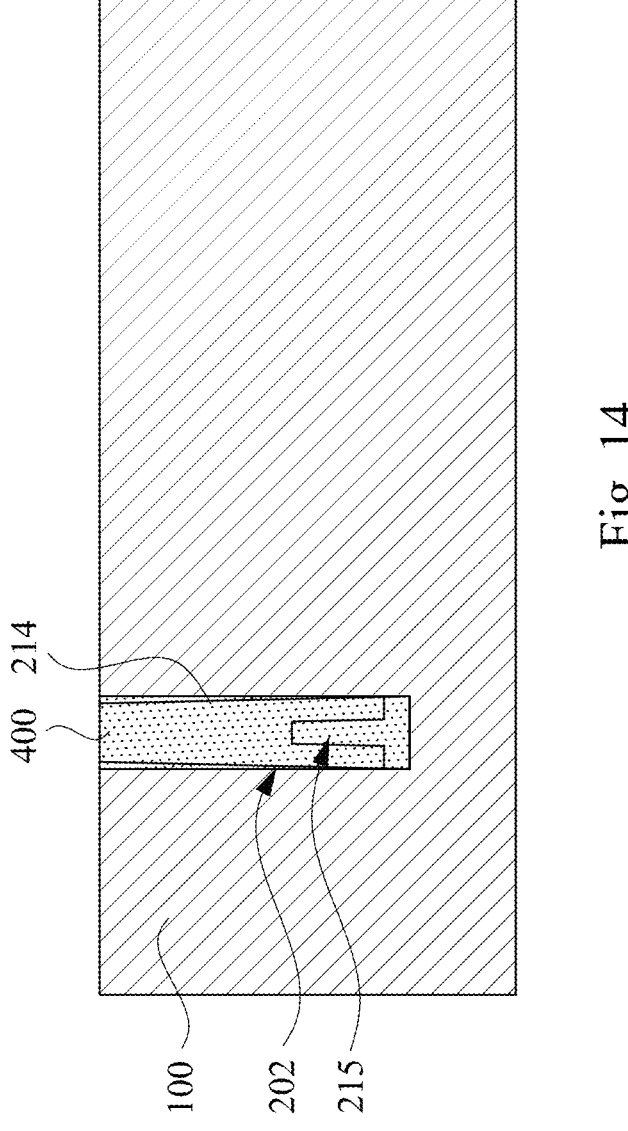

In FIG. 14, the final stage of the process includes the restoration of the RC floor 100 by sealing the drilled hole 202 using a sealing material 400, which allows for returning the RC floor 100 to its original condition, ensuring a smooth and continuous surface that is free from any structural weaknesses or irregularities. In some embodiments, the restoration process includes, by way of example and not limitation, filling the drilled hole 202 with a suitable sealing material 400, such as a high-strength concrete mix or an epoxy resin. The sealing material 400 can be selected to match the properties of the existing RC floor 100, providing a seamless integration that maintains the floor's structural integrity. The sealing material 400 is initially applied in its liquid phase or flowable phase, allowing it to flow into the drilled hole 202 in the RC floor 100 and fill the void left by the removal of the expansion bolt components and the downward displacement of the expandable sleeve 214. Once the sealing material 400 is applied, it undergoes a curing process. This curing transforms the sealing material 400 from its liquid phase into a solid phase, effectively restoring the integrity of the RC floor 100. The cured sealing material 400 allows for withstand subsequent semiconductor fabrication process, ensuring that the floor remains safe and functional.

In some embodiments, after curing, the sealing material 400 is planarized to ensure a smooth and even surface that aligns with the surrounding RC floor 100. This planarization can be achieved through various techniques such as grinding or other suitable methods, which remove any excess sealing material 400 outside the drilled hole 202 in the RC floor 100, and create a seamless transition between the repaired area and the existing RC floor 100. This floor restoration not only enhances the aesthetic appearance of the RC floor 100 but also reinforces its ability to support future installations and withstand further semiconductor fabrication operations. By sealing the drilled hole 202, the RC floor 100 can be prepared for continued use in the semiconductor manufacturing facility.

Figure 15:
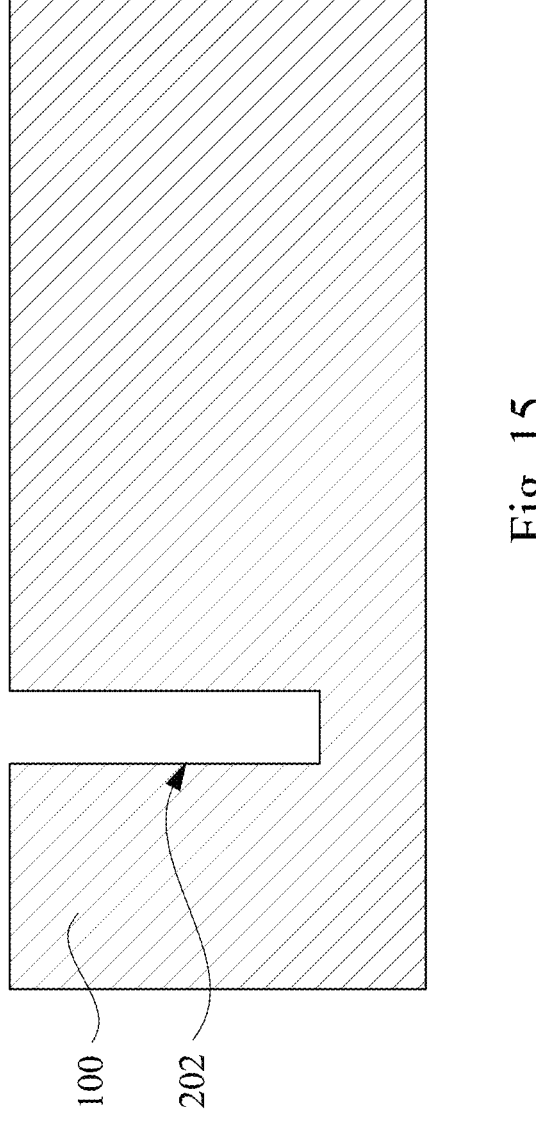
FIGS. 15-16 illustrate sequential stages involved in removing the vibration isolation foot and the expansion bolt, and restoring the RC floor, in accordance with some other embodiments of the present disclosure.
Figure 16:
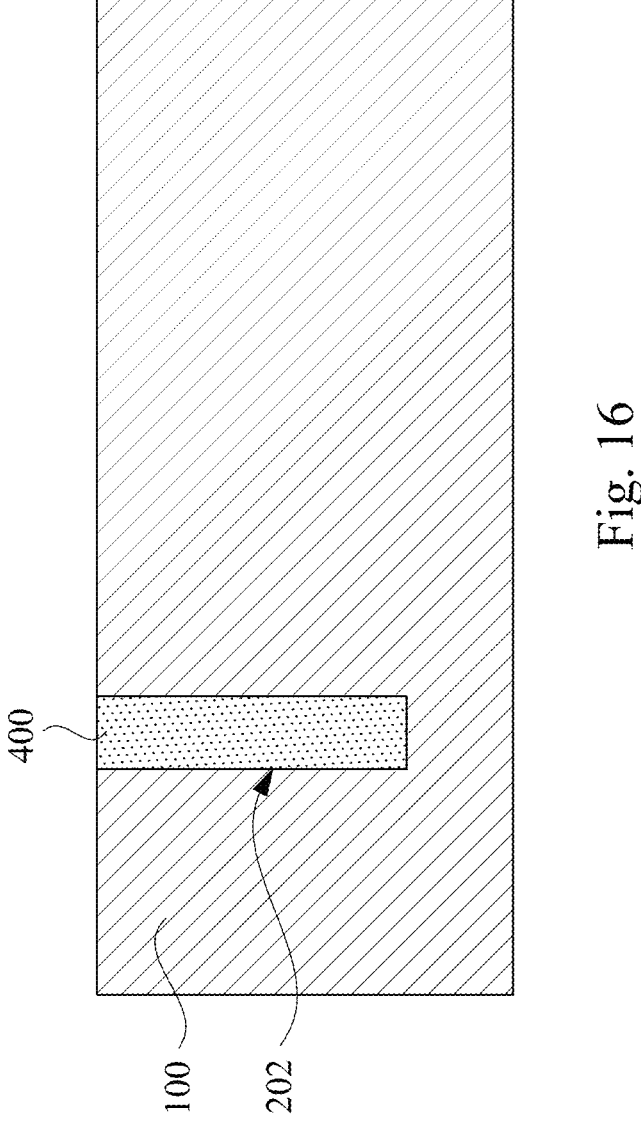

FIGS. 15 and 16 are side views zoomed-in to the partial region RI of FIG. 1 where the vibration isolation foot 112 is fixed to the RC floor 100. FIGS. 15 and 16 illustrate sequential stages involved in removing the vibration isolation foot 112 and the expansion bolt 210, and restoring the RC floor 100, in accordance with some other embodiments of the present disclosure. FIG. 15 illustrates another scenario following the operation of the hydraulic expansion bolt removal apparatus 300 as illustrated in FIG. 11A. As illustrated in FIG. 15, the hydraulic expansion bolt removal apparatus 300 extracts not only the washer 216, nut 218, and threaded rod 212 but also the expandable sleeve 214 from the drilled hole 202 in the RC floor 100. This comprehensive extraction is achieved by applying a sufficient upward force through the hydraulic expansion bolt removal apparatus 300, ensuring that all components of the expansion bolt 210 are removed from the drilled hole 202 in the RC floor 100. This approach is useful in scenarios where it is desirable to completely clear the drilled hole 202 of any remnants of the expansion bolt 210, facilitating a clean restoration of the RC floor 100.

Subsequently, in FIG. 16, the drilled hole 202 is sealed using a scaling material 400, such as a high-strength concrete mix or an epoxy resin. In some embodiments, the sealing material 400 is first applied in liquid phase into the drilled hole 202 in the RC floor 100, filling the void left by the removed components of the expansion bolt 210. Once applied, the sealing material 400 is cured, forming a solid and durable patch that effectively restores the integrity of the RC floor 100. In some embodiments, the sealing material 400 is then planarized with the surrounding floor surface by using, for example, grinding or other suitable planarization techniques.

Figure 17:
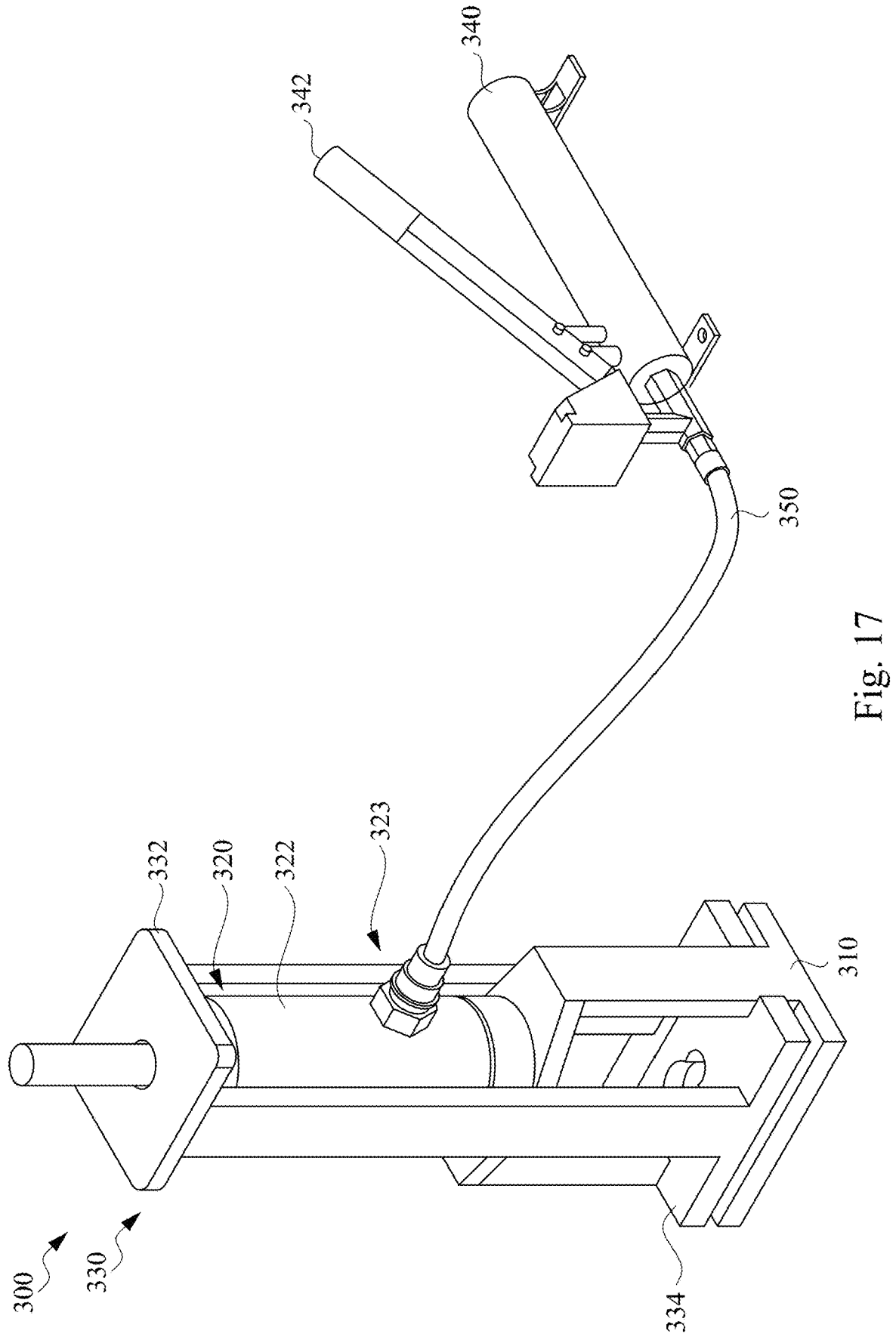
FIG. 17 is a perspective view illustrating an example hydraulic expansion bolt removal apparatus, in accordance with some embodiments of the present disclosure.
Figure 18A:
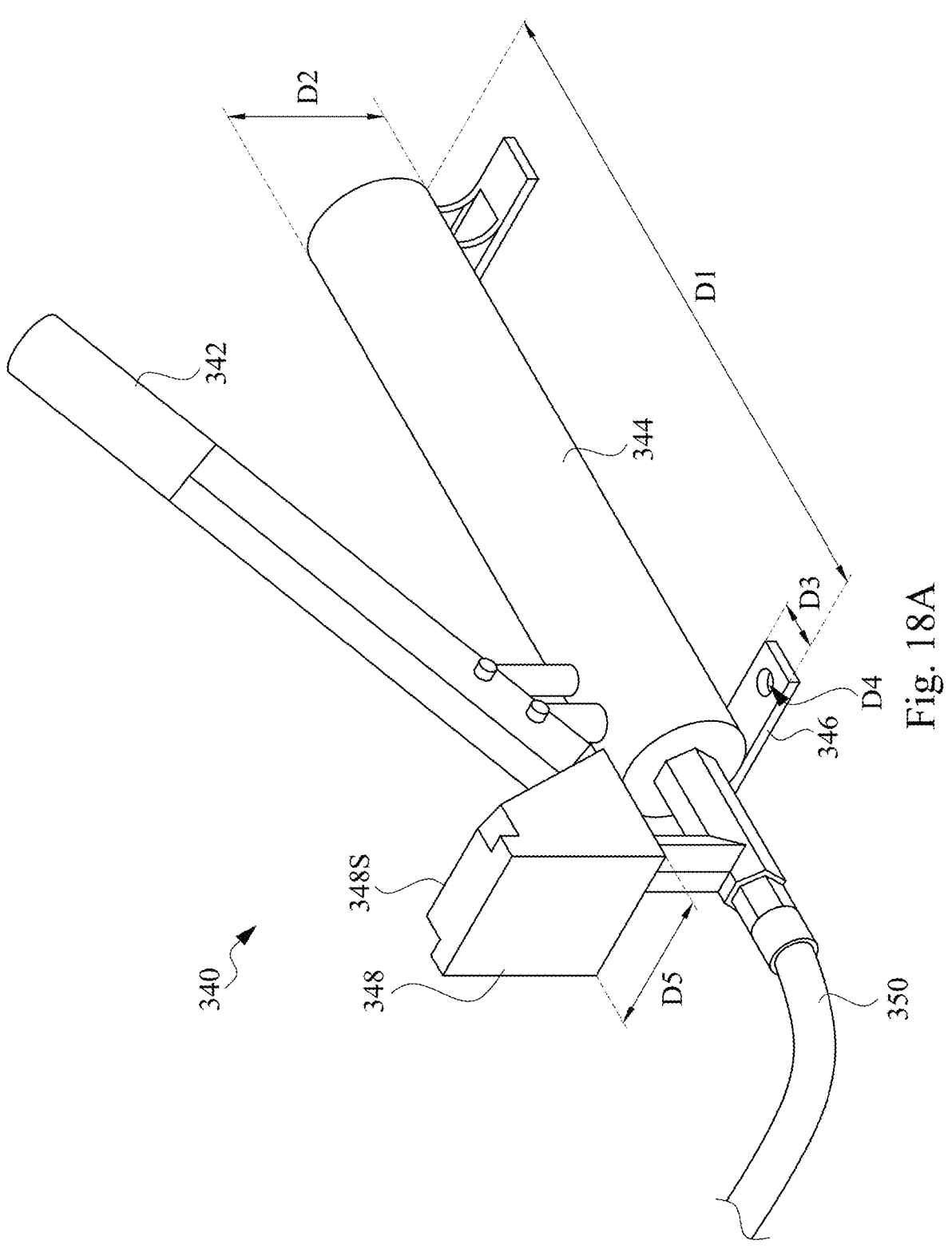
FIG. 18A is a perspective view illustrating an example hydraulic source and an example fluid conduit, in accordance with some embodiments of the present disclosure.
Figure 18B:
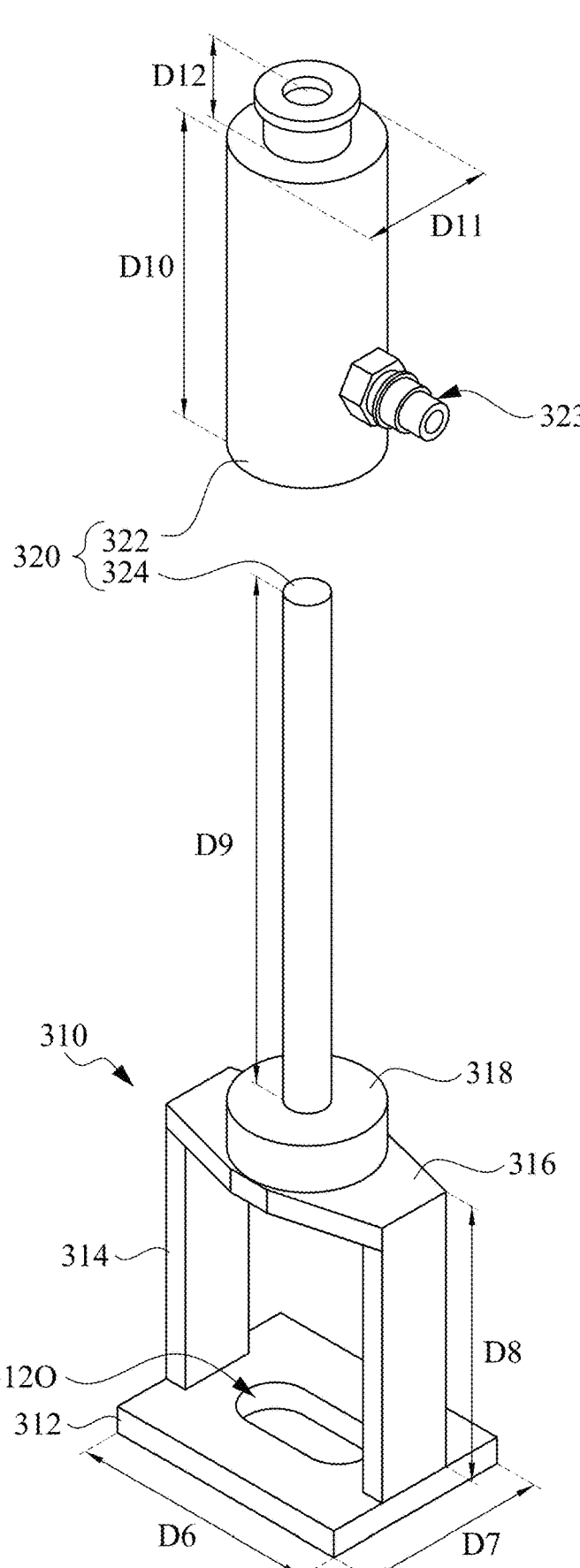
FIG. 18B is an exploded view illustrating an example hydraulic cylinder and an example ground support frame, in accordance with some embodiments of the present disclosure.
Figure 18C:
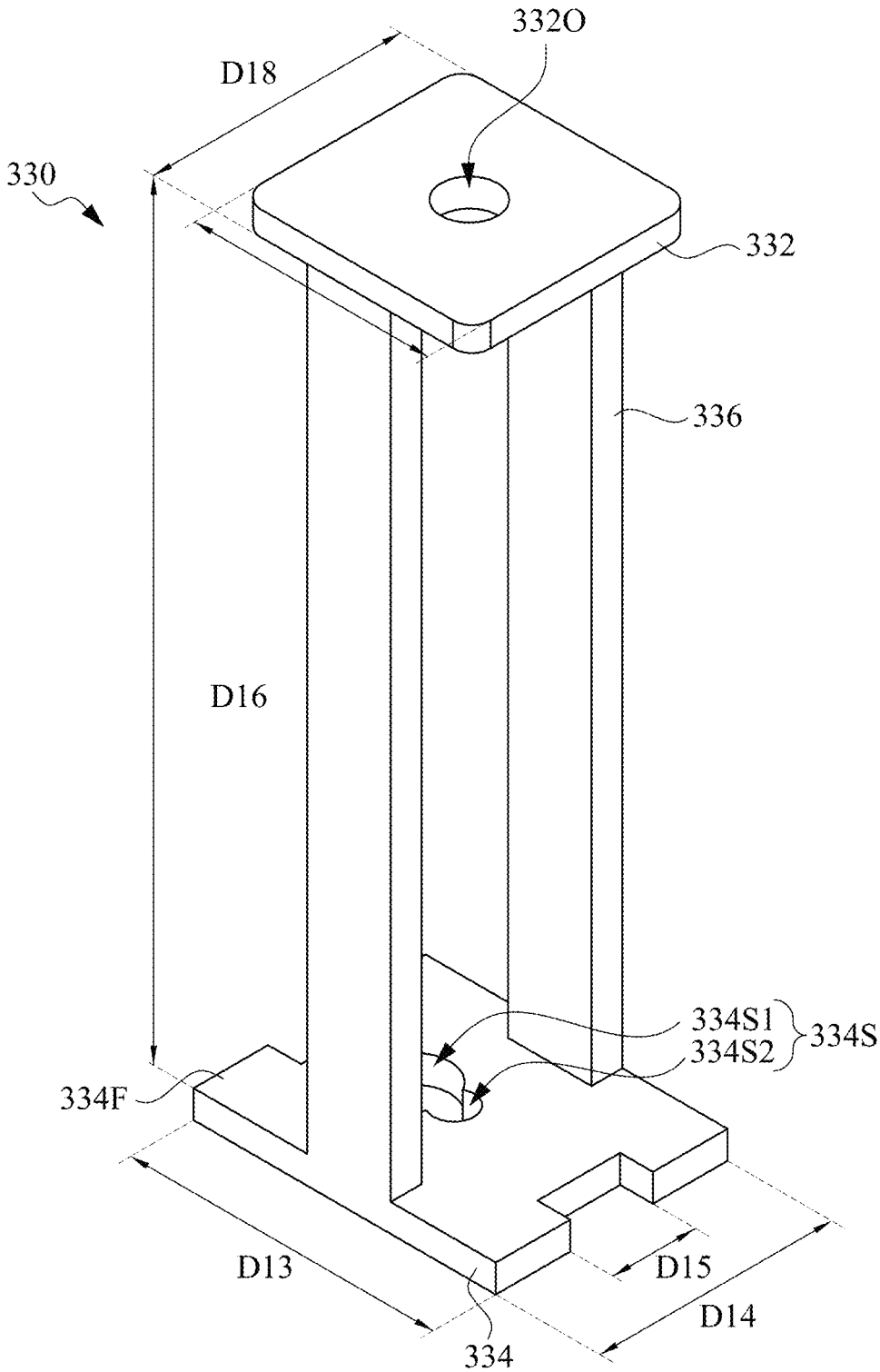
FIG. 18C is a perspective view illustrating an example bolt lifter, in accordance with some embodiments of the present disclosure.

FIG. 17 is a perspective view illustrating an example hydraulic expansion bolt removal apparatus 300, in accordance with some embodiments of the present disclosure. FIG. 18A is a perspective view illustrating an example hydraulic source 340 and an example fluid conduit 350, in accordance with some embodiments of the present disclosure. FIG. 18B is an exploded view illustrating an example hydraulic cylinder 320 and an example ground support frame 310, in accordance with some embodiments of the present disclosure. FIG. 18C is a perspective view illustrating an example bolt lifter 330, in accordance with some embodiments of the present disclosure.

As illustrated in FIGS. 17 and 18B, the ground support frame 310 serves as the foundational base of the hydraulic expansion bolt removal apparatus 300. The ground support frame 310 is designed to provide both stability and alignment for the other components, such as the hydraulic cylinder 320 and the bolt lifter 330, during operation. In some embodiments, the ground support frame 310 includes a base plate 312 that lies flat against the RC floor 100, with two vertical legs 314 extending upwards from opposing sides of the base plate 312. These vertical legs 314 are parallel to each other and symmetrically spaced apart along the length of base plate 312 to provide stability. The legs 314 are connected at their top ends by a top plate 316, which bridges across the two legs 314, forming a rigid structure for the ground support frame 310. This top plate 316 extends horizontally, with its planar surface extending perpendicular to the vertical axes of the two legs 314. In some embodiments, the ground support frame 310 further includes a cylindrical platform 318 atop the top plate 316. The piston rod 324 is concentrically disposed on the cylindrical platform 318.

In some embodiments, as illustrated in FIG. 18B, the base plate 312 has a length D6 in a range from about 100 mm to about 110 mm (e.g., about 108 mm), a width D7 in a range from about 75 mm to about 85 mm (e.g., about 80 mm), and a thickness in a range from about 8 mm to about 12 mm (e.g., about 10 mm). In some embodiments, the legs 314 each vertically extend a height D8 in a range from about 115 mm to about 125 mm (e.g., about 120 mm), and a width in a range from about 25 mm to about 35 mm (e.g., about 30 mm). In some embodiments, the base plate 312 has an elongated opening 3120 having a length in a range from about 50 mm to about 70 mm (e.g., about 60 mm), and a width in a range from about 20 mm to about 30 mm (e.g., about 26 mm). In some embodiments, the cylindrical platform 318 has a thickness in a range from about 15 mm to about 25 mm (e.g., about 20 mm), and a radius in a range from about 20 mm to about 30 mm (e.g., about 28 mm).

In some embodiments, the hydraulic cylinder 320 is disposed on the ground support frame 310 and has a vertical axis aligned with the vertical axis of the ground support frame 310. The hydraulic cylinder 320 comprises a piston rod 324 fixed onto the cylindrical platform 318, and a barrel 322 disposed over the piston rod 324 and vertically movable with respect to the piston rod 324 once the hydraulic pressured is applied. The barrel 322 is a cylindrical structure, with one end capped to contain hydraulic fluid and the opposite end opened to allow the piston rod 324 to extend outwards from a bottom rim of the barrel 322. The hydraulic cylinder 320 includes a fluid inlet port 323 located on a sidewall of the barrel 322. The fluid inlet port 323 fluidly connects the fluid chamber within the hydraulic cylinder 320 to the hydraulic source 340 through the fluid conduit 350, enabling hydraulic fluid to enter the fluid chamber of the hydraulic cylinder 320.

In some embodiments, the piston rod 324 vertically extends a height D9 in a range from about 210 mm to about 230 mm (e.g., about 220 mm), and has a radius in a range from about 5 mm to about 10 mm (e.g., about 8 mm). In some embodiments, the barrel 322 vertically extends a D10 in a range from about 130 mm to about 140 mm (e.g., about 134 mm), and a width D11 in a range from about 50 mm to about 60 mm (e.g., about 58 mm). In some embodiments, the barrel 322 has a radius in a range from about 25 mm to about 35 mm (e.g., about 30 mm). In some embodiments, the barrel 322 includes an annular ridge 327 extending upwards from a top surface of the barrel 322 by a distance D12 in a range from about 10 mm to about 20 mm (e.g., about 16 mm). In some embodiments, the annular ridge 327 has an outer radius in a range from about 15 mm to about 20 mm (e.g., about 19 mm), and an inner radius in a range from about 7 mm to about 12 mm (e.g., about 9 mm).

In some embodiments, as illustrated in FIGS. 17 and 18C, the bolt lifter 330 includes a top plate 332, a lifting fork 334, and two vertical legs 336 downwards extending from opposite sides of the top plate 332 to opposite sides of the lifting fork 334. The lifting fork 334 includes two fingers 334F separated by a slot 334S. In some embodiments, the slot 334S includes an entrance portion 334S1 extending from tips of the lifting fingers 334F into the lifting fork 334, and a rear portion 334S2 directly below the and vertically aligned with the opening 3320 in the top plate 332. In some embodiments, the lifting fork 334 has a length D13 in a range from about 100 mm to about 110 mm (e.g., about 108 mm), a width D14 in a range from about 70 mm to about 90 mm (e.g., about 80 mm), and a thickness in a range from about 8 mm to about 12 mm (e.g., about 10 mm). In some embodiments, the lifting fingers 334F are separated by a distance D15 in a range from about 25 mm to about 35 mm (e.g., about 30 mm). In some embodiments, the entrance portion 334S1 of the slot 334S has a radius in a range from about 10 mm to about 15 mm (e.g., about 13 mm), and the rear portion 334S2 of the slot 3334 has a radius in a range from about 7 mm to about 9 mm (e.g., about 8 mm). In some embodiments, each vertical leg 336 extends a height D16 in a range from about 275 mm to about 280 mm (e.g., about 277 mm). In some embodiments, the top plate 332 has a length D17 in a range from about 84 mm to about 86 mm (e.g., about 85 mm), a width D18 in a range from about 75 mm to about 81 mm (e.g., about 80 mm), and a thickness in a range from about 8 mm to about 12 mm (e.g., about 10 mm).

In some embodiments, as illustrated in FIGS. 17 and 18A, the hydraulic source 340 has a cylindrical reservoir 344 for storing hydraulic fluid and a manual pump mechanism operated by the handle 342 to pressurize the hydraulic fluid. The cylindrical reservoir 344 has a longitudinal axis extending horizontally over the RC floor 100. Adjacent the handle 342 is a display module 348, which houses electronic and mechanical components for monitoring the operation of the hydraulic source 340. This display module 348 has sensors monitoring the pressure and flow rate of the hydraulic fluid, and a display panel 348S facing the handle 342 to show the real-time monitored date, such as real-time pressure and flow rate of the hydraulic fluid, to the operator. The hydraulic source 340 further includes brackets 346 below the cylindrical reservoir 344, serving to secure the cylindrical reservoir 344 to the RC floor 100. The fluid conduit 350 is a flexible conduit extending from a longitudinal end of the cylindrical reservoir 344 to the fluid inlet port 323 of the hydraulic cylinder 320.

In some embodiments, the cylindrical reservoir 344 has a length D1 in a range from about 330 mm to about 350 mm (e.g., about 345 mm), and a height D2 in a range from about 80 mm to about 90 mm (e.g., about 87 mm). In some embodiments, the brackets 346 each have a width D3 in a range from about 20 mm to about 30 mm (e.g., about 25 mm), and a hole having a radius D4 in a range from about 3 mm to about 6 mm (e.g., about 5 mm). In some embodiments, the display module 348 has a width D5 in a range from about 70 mm to about 80 mm (e.g., about 75 mm).

Based on the above discussions, it can be seen that the present disclosure in various embodiments offers advantages. It is understood, however, that other embodiments may offer additional advantages, and not all advantages are necessarily disclosed herein, and that no particular advantage is required for all embodiments. One advantage is the expansion bolts can be extracted from the RC floor with greater efficiency and case. Another advantage is that the hydraulic expansion bolt removal apparatus is user-friendly and can be operated with minimal training. Another advantage is that the hydraulic expansion bolt removal apparatus is capable of removing expansion bolts from various locations, including floors and walls. Another advantage is that the hydraulic expansion bolt removal apparatus is lightweight, with a total weight of approximately 3 kg, making it easy to transport. Another advantage is that the hydraulic expansion bolt removal apparatus operates silently with reduced noise and vibrations, making it ideal for use in FABs.

In some embodiments, a method includes removing a washer and a nut from a threaded rod of an expansion bolt that is secured to a drilled hole; after removing the washer and the nut, removing a foot of a semiconductor processing apparatus from the threaded rod; placing the washer and the nut back to the threaded rod of the expansion bolt; moving a lifting fork of a bolt lifter such that fingers of the lifting fork are located directly below the washer; and lifting the lifting fork, by using a hydraulic cylinder, to extract the washer, the nut, and the threaded rod of the expansion bolt away from the drilled hole. In some embodiments, lifting the lifting fork comprises manually pressurizing a hydraulic fluid within the hydraulic cylinder. In some embodiments, manually pressurizing a hydraulic fluid within the hydraulic cylinder comprises pressing down a handle of a hydraulic source. In some embodiments, the hydraulic source is fluidly connected to the hydraulic cylinder by a fluid conduit. In some embodiments, the fluid conduit is flexible. In some embodiments, lifting the lifting fork further extracts an expandable sleeve of the expansion bolt away from the drilled hole. In some embodiments, the method further includes after extracting the washer, the nut, and the threaded rod of the expansion bolt away from the drilled hole, applying a downward force to an expandable sleeve such that the expandable sleeve completely falls into the drilled hole. In some embodiments, the method further includes after the expandable sleeve completely falls into the drilled hole, sealing the drilled hole using a sealing material. In some embodiments, lifting the lifting fork is performed such that the fingers of the lifting fork press upwards against a bottom surface of the washer. In some embodiments, lifting the lifting fork comprises lifting a top plate of the bolt lifter by using the hydraulic cylinder, wherein the bolt lifter comprises legs vertically extending from opposite sides of the top plate to opposite sides of the lifting fork.

In some embodiments, a method includes removing a foot of a semiconductor processing apparatus from an expansion bolt secured to a hole in a floor; and after removing the foot of the semiconductor processing apparatus, extracting a threaded rod of the expansion bolt from the hole in the floor. The extraction includes positioning a lifting fork of a bolt lifter to engage the expansion bolt in a slot on the lifting fork; and pressurizing a hydraulic cylinder located between the lifting fork and a top plate of the bolt lifter, such that the lifting fork moves upwards to extract the threaded rod of the expansion bolt. In some embodiments, the hydraulic cylinder is pressurized by a hydraulic source fluidly connected to a fluid inlet port of the hydraulic cylinder. In some embodiments, the fluid inlet port is on a sidewall of a barrel of the hydraulic cylinder. In some embodiments, the hydraulic source is fluidly connected to the fluid inlet port of the hydraulic cylinder through a flexible conduit. In some embodiments, pressurizing the hydraulic cylinder comprises pressing down a handle of the hydraulic source disposed over a reservoir of the hydraulic source. In some embodiments, pressuring the hydraulic cylinder is performed such that the lifting fork presses upwards against a bottom surface of a washer fitted on the threaded rod. In some embodiments, pressuring the hydraulic cylinder is performed such that the lifting fork further extracts an expandable sleeve of the expansion bolt.

In some embodiments, an apparatus includes a support frame, a hydraulic cylinder, a hydraulic source, and a bolt lifter. The hydraulic cylinder includes a piston rod fixed to the support frame, and a barrel over the piston rod and movably receiving the piston rod. The hydraulic source is in fluid communication with a fluid chamber within the hydraulic cylinder. The bolt lifter includes a top plate above the barrel of the hydraulic cylinder, and a lifting fork below the piston rod of the hydraulic cylinder, wherein the lifting fork is liftable by a linear motion of the barrel relative to the piston rod. In some embodiments, the hydraulic source comprises a reservoir and a handle operable to pressurize a hydraulic fluid in the reservoir. In some embodiments, the apparatus further includes a flexible conduit fluidly connecting the hydraulic source to the hydraulic cylinder. In some embodiments, the hydraulic cylinder has a fluid inlet port on a sidewall of the barrel of the hydraulic cylinder. In some embodiments, the fluid chamber is disposed above the piston rod. In some embodiments, the lifting fork has two fingers separated by a slot, and the slot is directly below the barrel.

In some embodiments an apparatus includes a hydraulic source, a hydraulic cylinder, and a bolt lifter. The hydraulic cylinder is pressurizable by the hydraulic source. The hydraulic cylinder includes a piston rod and a barrel positioned over the piston rod. The barrel is elevatable in response to a hydraulic pressure generated by the hydraulic source. The bolt lifter includes a lifting fork elevatable by the barrel of the hydraulic cylinder. The lifting fork includes two fingers and a slot separating the fingers. The slot is positioned below the piston rod. In some embodiments, the apparatus further a support frame on which the piston rod is fixed. In some embodiments, the apparatus further includes a conduit fluidly connecting the hydraulic source and the hydraulic cylinder. In some embodiments, the conduit is a flexible conduit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
removing a washer and a nut from a threaded rod of an expansion bolt that is secured to a drilled hole;
after removing the washer and the nut, removing a foot of a semiconductor processing apparatus from the threaded rod;
placing the washer and the nut back to the threaded rod of the expansion bolt;
moving a lifting fork of a bolt lifter such that fingers of the lifting fork are located directly below the washer; and
lifting the lifting fork, by using a hydraulic cylinder, to extract the washer, the nut, and the threaded rod of the expansion bolt away from the drilled hole, wherein lifting the lifting fork comprises lifting a top plate of the bolt lifter by using the hydraulic cylinder, wherein the bolt lifter comprises legs vertically extending from opposite sides of the top plate to opposite sides of the lifting fork.

2. The method of claim 1, wherein lifting the lifting fork comprises manually pressurizing a hydraulic fluid within the hydraulic cylinder.

3. The method of claim 2, wherein manually pressurizing a hydraulic fluid within the hydraulic cylinder comprises pressing down a handle of a hydraulic source.

4. The method of claim 3, wherein the hydraulic source is fluidly connected to the hydraulic cylinder by a fluid conduit.

5. The method of claim 4, wherein the fluid conduit is flexible.

6. The method of claim 1, wherein lifting the lifting fork further extracts an expandable sleeve of the expansion bolt away from the drilled hole.

7. The method of claim 1, further comprising:
after extracting the washer, the nut, and the threaded rod of the expansion bolt away from the drilled hole, applying a downward force to an expandable sleeve such that the expandable sleeve completely falls into the drilled hole.

8. The method of claim 7, further comprising:
after the expandable sleeve completely falls into the drilled hole, sealing the drilled hole using a sealing material.

9. The method of claim 1, wherein lifting the lifting fork is performed such that the fingers of the lifting fork press upwards against a bottom surface of the washer.

10. A method, comprising:
removing a foot of a semiconductor processing apparatus from an expansion bolt secured to a hole in a floor; and
after removing the foot of the semiconductor processing apparatus, extracting a threaded rod of the expansion bolt from the hole in the floor, the extraction comprising:
after removing the foot, placing a washer and a nut onto the threaded rod;
positioning a lifting fork of a bolt lifter to engage the expansion bolt in a slot on the lifting fork; and
pressurizing a hydraulic cylinder located between the lifting fork and a top plate of the bolt lifter, such that the lifting fork moves upwards to extract the threaded rod of the expansion bolt, wherein pressurizing the hydraulic cylinder is performed such that the lifting fork presses upwards against a bottom surface of the washer fitted on the threaded rod.

11. The method of claim 10, wherein the hydraulic cylinder is pressurized by a hydraulic source fluidly connected to a fluid inlet port of the hydraulic cylinder.

12. The method of claim 11, wherein the fluid inlet port is on a sidewall of a barrel of the hydraulic cylinder.

13. The method of claim 11, wherein the hydraulic source is fluidly connected to the fluid inlet port of the hydraulic cylinder through a flexible conduit.

14. The method of claim 11, wherein pressurizing the hydraulic cylinder comprises pressing down a handle of the hydraulic source disposed over a reservoir of the hydraulic source.

15. The method of claim 10, wherein pressurizing the hydraulic cylinder is performed such that the lifting fork further extracts an expandable sleeve of the expansion bolt.

16. A method, comprising:
removing a washer and a nut from a threaded rod of an expansion bolt that is secured to a drilled hole in a floor;
after removing the washer and the nut, removing a foot of a semiconductor processing apparatus from the threaded rod;
placing the washer and the nut back to the threaded rod of the expansion bolt;
moving a lifting fork of a bolt lifter to a level below the washer placed on the threaded rod of the expansion bolt; and
pressurizing a hydraulic cylinder located between the lifting fork and a top plate of the bolt lifter, such that the lifting fork moves upwards to extract the threaded rod away from the floor, wherein the lifting fork further extracts an expandable sleeve of the expansion bolt away from the floor.

17. The method of claim 16, wherein the hydraulic cylinder comprises a piston rod and a barrel positioned over the piston rod, wherein the barrel is elevated in response to pressurizing the hydraulic cylinder.

18. The method of claim 16, wherein the hydraulic cylinder is pressurized by a hydraulic source fluidly connected to the hydraulic cylinder by using a flexible conduit.

19. The method of claim 16, wherein pressurizing the hydraulic cylinder is performed such that a top plate of the bolt lifter is lifted, wherein the bolt lifter comprises legs vertically extending from opposite sides of the top plate to opposite sides of the lifting fork.

20. The method of claim 16, wherein the lifting fork has lifting fingers and a slot between the lifting fingers.

\*   \*   \*   \*   \*